US010275892B2

(12) United States Patent
Bleibel et al.

(10) Patent No.: US 10,275,892 B2
(45) Date of Patent: Apr. 30, 2019

(54) MULTI-VIEW SCENE SEGMENTATION AND PROPAGATION

(71) Applicant: Google LLC, Mountain View, CA (US)

(72) Inventors: Francois Bleibel, Mountain View, CA (US); Tingfang Du, San Jose, CA (US); Thomas Nonn, Berkeley, CA (US); Jie Tan, Foster City, CA (US)

(73) Assignee: GOOGLE LLC, Mountain View, CA (US)

( * ) Notice: Subject to any disclaimer, the term of this patent is extended or adjusted under 35 U.S.C. 154(b) by 61 days.

(21) Appl. No.: 15/462,752

(22) Filed: Mar. 17, 2017

(65) Prior Publication Data

US 2017/0358092 A1 Dec. 14, 2017

Related U.S. Application Data

(60) Provisional application No. 62/347,734, filed on Jun. 9, 2016.

(51) Int. Cl.
*G06K 9/00* (2006.01)
*G06T 7/194* (2017.01)

(52) U.S. Cl.
CPC .... *G06T 7/194* (2017.01); *G06T 2207/10012* (2013.01); *G06T 2207/10016* (2013.01); *G06T 2207/10021* (2013.01); *G06T 2207/10024* (2013.01); *G06T 2207/10028* (2013.01); *G06T 2207/10052* (2013.01); *G06T 2207/20076* (2013.01); *G06T 2207/20104* (2013.01); *G06T 2215/16* (2013.01)

(58) Field of Classification Search
None
See application file for complete search history.

(56) References Cited

U.S. PATENT DOCUMENTS

| 725,567 A | 4/1903 | Ives |
|---|---|---|
| 4,383,170 A | 5/1983 | Takagi et al. |

(Continued)

FOREIGN PATENT DOCUMENTS

| CN | 101226292 | 7/2008 |
|---|---|---|
| CN | 101309359 | 11/2008 |

(Continued)

OTHER PUBLICATIONS

Nokia, "City Lens", May 2012.
(Continued)

*Primary Examiner* — Hadi Akhavannik

(57) ABSTRACT

A depth-based effect may be applied to a multi-view video stream to generate a modified multi-view video stream. User input may designate a boundary between a foreground region and a background region, at a different depth from the foreground region, of a reference image of the video stream. Based on the user input, a reference mask may be generated to indicate the foreground region and the background region. The reference mask may be used to generate one or more other masks that indicate the foreground and background regions for one or more different images, from different frames and/or different views from the reference image. The reference mask and other mask(s) may be used to apply the effect to the multi-view video stream to generate the modified multi-view video stream.

34 Claims, 16 Drawing Sheets

(56) References Cited

U.S. PATENT DOCUMENTS

| | | |
|---|---|---|
| 4,661,986 A | 4/1987 | Adelson |
| 4,694,185 A | 9/1987 | Weiss |
| 4,920,419 A | 4/1990 | Easterly |
| 5,076,687 A | 12/1991 | Adelson |
| 5,077,810 A | 12/1991 | D'Luna |
| 5,251,019 A | 10/1993 | Moorman et al. |
| 5,282,045 A | 1/1994 | Mimura et al. |
| 5,499,069 A | 3/1996 | Griffith |
| 5,572,034 A | 11/1996 | Karellas |
| 5,610,390 A | 3/1997 | Miyano |
| 5,748,371 A | 5/1998 | Cathey, Jr. et al. |
| 5,757,423 A | 5/1998 | Tanaka et al. |
| 5,818,525 A | 10/1998 | Elabd |
| 5,835,267 A | 11/1998 | Mason et al. |
| 5,907,619 A | 5/1999 | Davis |
| 5,949,433 A | 9/1999 | Klotz |
| 5,974,215 A | 10/1999 | Bilbro et al. |
| 6,005,936 A | 12/1999 | Shimizu et al. |
| 6,021,241 A | 2/2000 | Bilbro et al. |
| 6,023,523 A | 2/2000 | Cohen et al. |
| 6,028,606 A | 2/2000 | Kolb et al. |
| 6,034,690 A | 3/2000 | Gallery et al. |
| 6,061,083 A | 5/2000 | Aritake et al. |
| 6,061,400 A | 5/2000 | Pearlstein et al. |
| 6,069,565 A | 5/2000 | Stern et al. |
| 6,075,889 A | 6/2000 | Hamilton, Jr. et al. |
| 6,091,860 A | 7/2000 | Dimitri |
| 6,097,394 A | 8/2000 | Levoy et al. |
| 6,115,556 A | 9/2000 | Reddington |
| 6,137,100 A | 10/2000 | Fossum et al. |
| 6,169,285 B1 | 1/2001 | Pertrillo et al. |
| 6,201,899 B1 | 3/2001 | Bergen |
| 6,221,687 B1 | 4/2001 | Abramovich |
| 6,320,979 B1 | 11/2001 | Melen |
| 6,424,351 B1 | 7/2002 | Bishop et al. |
| 6,448,544 B1 | 9/2002 | Stanton et al. |
| 6,466,207 B1 | 10/2002 | Gortler et al. |
| 6,476,805 B1 | 11/2002 | Shum et al. |
| 6,479,827 B1 | 11/2002 | Hamamoto et al. |
| 6,483,535 B1 | 11/2002 | Tamburrino et al. |
| 6,529,265 B1 | 3/2003 | Henningsen |
| 6,577,342 B1 | 6/2003 | Webster |
| 6,587,147 B1 | 7/2003 | Li |
| 6,597,859 B1 | 7/2003 | Leinhardt et al. |
| 6,606,099 B2 | 8/2003 | Yamada |
| 6,658,168 B1 | 12/2003 | Kim |
| 6,674,430 B1 | 1/2004 | Kaufman et al. |
| 6,687,419 B1 | 2/2004 | Atkin |
| 6,768,980 B1 | 7/2004 | Meyer et al. |
| 6,785,667 B2 | 8/2004 | Orbanes et al. |
| 6,833,865 B1 | 12/2004 | Fuller et al. |
| 6,842,297 B2 | 1/2005 | Dowski, Jr. et al. |
| 6,900,841 B1 | 5/2005 | Mihara |
| 6,924,841 B2 | 8/2005 | Jones |
| 6,927,922 B2 | 8/2005 | George et al. |
| 7,003,061 B2 * | 2/2006 | Wilensky ............... G06T 7/12 |
| | | 348/135 |
| 7,015,954 B1 | 3/2006 | Foote et al. |
| 7,025,515 B2 | 4/2006 | Woods |
| 7,034,866 B1 | 4/2006 | Colmenarez et al. |
| 7,079,698 B2 | 7/2006 | Kobayashi |
| 7,102,666 B2 | 9/2006 | Kanade et al. |
| 7,164,807 B2 | 1/2007 | Morton |
| 7,206,022 B2 | 4/2007 | Miller et al. |
| 7,239,345 B1 | 7/2007 | Rogina |
| 7,286,295 B1 | 10/2007 | Sweatt et al. |
| 7,304,670 B1 | 12/2007 | Hussey et al. |
| 7,329,856 B2 | 2/2008 | Ma et al. |
| 7,336,430 B2 | 2/2008 | George |
| 7,417,670 B1 | 8/2008 | Linzer et al. |
| 7,469,381 B2 | 12/2008 | Ording |
| 7,477,304 B2 | 1/2009 | Hu |
| 7,587,109 B1 | 9/2009 | Reininger |
| 7,620,309 B2 | 11/2009 | Georgiev |
| 7,623,726 B1 | 11/2009 | Georgiev |
| 7,633,513 B2 | 12/2009 | Kondo et al. |
| 7,683,951 B2 | 3/2010 | Aotsuka |
| 7,687,757 B1 | 3/2010 | Tseng et al. |
| 7,723,662 B2 | 5/2010 | Levoy et al. |
| 7,724,952 B2 | 5/2010 | Shum et al. |
| 7,748,022 B1 | 6/2010 | Frazier |
| 7,847,825 B2 | 12/2010 | Aoki et al. |
| 7,936,377 B2 | 5/2011 | Friedhoff et al. |
| 7,936,392 B2 | 5/2011 | Ng et al. |
| 7,941,634 B2 | 5/2011 | Georgi |
| 7,945,653 B2 | 5/2011 | Zuckerberg et al. |
| 7,949,252 B1 | 5/2011 | Georgiev |
| 7,982,776 B2 | 7/2011 | Dunki-Jacobs et al. |
| 8,013,904 B2 | 9/2011 | Tan et al. |
| 8,085,391 B2 | 12/2011 | Machida et al. |
| 8,106,856 B2 | 1/2012 | Matas et al. |
| 8,115,814 B2 | 2/2012 | Iwase et al. |
| 8,155,456 B2 | 4/2012 | Babacan |
| 8,155,478 B2 | 4/2012 | Vitsnudel et al. |
| 8,189,089 B1 | 5/2012 | Georgiev et al. |
| 8,228,417 B1 | 7/2012 | Georgiev et al. |
| 8,248,515 B2 | 8/2012 | Ng et al. |
| 8,259,198 B2 | 9/2012 | Cote et al. |
| 8,264,546 B2 | 9/2012 | Witt |
| 8,279,325 B2 | 10/2012 | Pitts et al. |
| 8,289,440 B2 | 10/2012 | Knight et al. |
| 8,290,358 B1 | 10/2012 | Georgiev |
| 8,310,554 B2 | 11/2012 | Aggarwal et al. |
| 8,315,476 B1 | 11/2012 | Georgiev et al. |
| 8,345,144 B1 | 1/2013 | Georgiev et al. |
| 8,400,533 B1 | 3/2013 | Szedo |
| 8,400,555 B1 | 3/2013 | Georgiev et al. |
| 8,411,948 B2 * | 4/2013 | Rother ............... G06K 9/34 |
| | | 382/173 |
| 8,427,548 B2 | 4/2013 | Lim et al. |
| 8,442,397 B2 | 5/2013 | Kang et al. |
| 8,446,516 B2 | 5/2013 | Pitts et al. |
| 8,494,304 B2 | 7/2013 | Venable et al. |
| 8,531,581 B2 | 9/2013 | Shroff |
| 8,542,933 B2 | 9/2013 | Venkataraman et al. |
| 8,559,705 B2 | 10/2013 | Ng |
| 8,570,426 B2 | 10/2013 | Pitts et al. |
| 8,577,216 B2 | 11/2013 | Li et al. |
| 8,581,998 B2 | 11/2013 | Ohno |
| 8,589,374 B2 | 11/2013 | Chaudhri |
| 8,593,564 B2 | 11/2013 | Border et al. |
| 8,605,199 B2 | 12/2013 | Imai |
| 8,614,764 B2 | 12/2013 | Pitts et al. |
| 8,619,082 B1 | 12/2013 | Ciurea et al. |
| 8,629,930 B2 | 1/2014 | Brueckner et al. |
| 8,665,440 B1 | 3/2014 | Kompaniets et al. |
| 8,675,073 B2 | 3/2014 | Aagaard et al. |
| 8,724,014 B2 | 5/2014 | Ng et al. |
| 8,736,710 B2 | 5/2014 | Spielberg |
| 8,736,751 B2 | 5/2014 | Yun |
| 8,749,620 B1 | 6/2014 | Pitts et al. |
| 8,750,509 B2 | 6/2014 | Renkis |
| 8,754,829 B2 | 6/2014 | Lapstun |
| 8,760,566 B2 | 6/2014 | Pitts et al. |
| 8,768,102 B1 | 7/2014 | Ng et al. |
| 8,797,321 B1 | 8/2014 | Bertolami et al. |
| 8,811,769 B1 | 8/2014 | Pitts et al. |
| 8,831,377 B2 | 9/2014 | Pitts et al. |
| 8,860,856 B2 | 10/2014 | Wetzstein et al. |
| 8,879,901 B2 | 11/2014 | Caldwell et al. |
| 8,903,232 B1 | 12/2014 | Caldwell |
| 8,908,058 B2 | 12/2014 | Akeley et al. |
| 8,948,545 B2 | 2/2015 | Akeley et al. |
| 8,953,882 B2 | 2/2015 | Lim et al. |
| 8,971,625 B2 | 3/2015 | Pitts et al. |
| 8,976,288 B2 | 3/2015 | Ng et al. |
| 8,988,317 B1 | 3/2015 | Liang et al. |
| 8,995,785 B2 | 3/2015 | Knight et al. |
| 8,997,021 B2 | 3/2015 | Liang et al. |
| 9,001,226 B1 | 4/2015 | Ng et al. |
| 9,013,611 B1 | 4/2015 | Szedo |
| 9,106,914 B2 | 8/2015 | Doser |
| 9,172,853 B2 | 10/2015 | Pitts et al. |
| 9,184,199 B2 | 11/2015 | Pitts et al. |

(56) References Cited

U.S. PATENT DOCUMENTS

| | | |
|---|---|---|
| 9,201,193 B1 | 12/2015 | Smith |
| 9,210,391 B1 | 12/2015 | Mills |
| 9,214,013 B2 | 12/2015 | Venkataraman et al. |
| 9,294,662 B2 | 3/2016 | Vondran, Jr. et al. |
| 9,300,932 B2 | 3/2016 | Knight et al. |
| 9,305,375 B2 | 4/2016 | Akeley |
| 9,305,956 B2 | 4/2016 | Pittes et al. |
| 9,386,288 B2 | 7/2016 | Akeley et al. |
| 9,392,153 B2 | 7/2016 | Myhre et al. |
| 9,419,049 B2 | 8/2016 | Pitts et al. |
| 9,467,607 B2 | 10/2016 | Ng et al. |
| 9,497,380 B1 | 11/2016 | Jannard et al. |
| 9,607,424 B2 | 3/2017 | Ng et al. |
| 9,628,684 B2 | 4/2017 | Liang et al. |
| 9,635,332 B2 | 4/2017 | Carroll et al. |
| 9,639,945 B2 | 5/2017 | Oberheu et al. |
| 9,647,150 B2 | 5/2017 | Blasco Claret |
| 9,681,069 B2 | 6/2017 | El-Ghoroury et al. |
| 9,774,800 B2 | 9/2017 | El-Ghoroury et al. |
| 9,858,649 B2 | 1/2018 | Liang et al. |
| 9,866,810 B2 | 1/2018 | Knight et al. |
| 9,900,510 B1 | 2/2018 | Karafin et al. |
| 9,979,909 B2 | 5/2018 | Kuang et al. |
| 2001/0048968 A1 | 12/2001 | Cox et al. |
| 2001/0053202 A1 | 12/2001 | Mazess et al. |
| 2002/0001395 A1 | 1/2002 | Davis et al. |
| 2002/0015048 A1 | 2/2002 | Nister |
| 2002/0061131 A1 | 5/2002 | Sawhney |
| 2002/0109783 A1 | 8/2002 | Hayashi et al. |
| 2002/0159030 A1 | 10/2002 | Frey et al. |
| 2002/0199106 A1 | 12/2002 | Hayashi |
| 2003/0081145 A1 | 5/2003 | Seaman et al. |
| 2003/0103670 A1 | 6/2003 | Schoelkopf et al. |
| 2003/0117511 A1 | 6/2003 | Belz et al. |
| 2003/0123700 A1 | 7/2003 | Wakao |
| 2003/0133018 A1 | 7/2003 | Ziemkowski |
| 2003/0147252 A1 | 8/2003 | Fioravanti |
| 2003/0156077 A1 | 8/2003 | Balogh |
| 2004/0002179 A1 | 1/2004 | Barton et al. |
| 2004/0012688 A1 | 1/2004 | Tinnerinno et al. |
| 2004/0012689 A1 | 1/2004 | Tinnerinno et al. |
| 2004/0101166 A1 | 5/2004 | Williams et al. |
| 2004/0114176 A1 | 6/2004 | Bodin et al. |
| 2004/0135780 A1 | 7/2004 | Nims |
| 2004/0189686 A1 | 9/2004 | Tanguay et al. |
| 2004/0257360 A1 | 12/2004 | Sieckmann |
| 2005/0031203 A1 | 2/2005 | Fukuda |
| 2005/0049500 A1 | 3/2005 | Babu et al. |
| 2005/0052543 A1 | 3/2005 | Li et al. |
| 2005/0080602 A1 | 4/2005 | Snyder et al. |
| 2005/0162540 A1 | 7/2005 | Yata |
| 2005/0212918 A1 | 9/2005 | Serra et al. |
| 2005/0276441 A1 | 12/2005 | Debevec |
| 2006/0023066 A1 | 2/2006 | Li et al. |
| 2006/0050170 A1 | 3/2006 | Tanaka |
| 2006/0056040 A1 | 3/2006 | Lan |
| 2006/0056604 A1 | 3/2006 | Sylthe et al. |
| 2006/0072175 A1 | 4/2006 | Oshino |
| 2006/0082879 A1 | 4/2006 | Miyoshi et al. |
| 2006/0130017 A1 | 6/2006 | Cohen et al. |
| 2006/0208259 A1 | 9/2006 | Jeon |
| 2006/0248348 A1 | 11/2006 | Wakao et al. |
| 2006/0256226 A1 | 11/2006 | Alon et al. |
| 2006/0274210 A1 | 12/2006 | Kim |
| 2006/0285741 A1 | 12/2006 | Subbarao |
| 2007/0008317 A1 | 1/2007 | Lundstrom |
| 2007/0019883 A1 | 1/2007 | Wong et al. |
| 2007/0030357 A1 | 2/2007 | Levien et al. |
| 2007/0033588 A1 | 2/2007 | Landsman |
| 2007/0052810 A1 | 3/2007 | Monroe |
| 2007/0071316 A1 | 3/2007 | Kubo |
| 2007/0081081 A1 | 4/2007 | Cheng |
| 2007/0097206 A1 | 5/2007 | Houvener |
| 2007/0103558 A1 | 5/2007 | Cai et al. |
| 2007/0113198 A1 | 5/2007 | Robertson et al. |
| 2007/0140676 A1 | 6/2007 | Nakahara |
| 2007/0188613 A1 | 8/2007 | Nobori et al. |
| 2007/0201853 A1 | 8/2007 | Petschnigg |
| 2007/0229653 A1 | 10/2007 | Matusik et al. |
| 2007/0230944 A1 | 10/2007 | Georgiev |
| 2007/0269108 A1 | 11/2007 | Steinberg et al. |
| 2008/0007626 A1 | 1/2008 | Wernersson |
| 2008/0012988 A1 | 1/2008 | Baharav et al. |
| 2008/0018668 A1 | 1/2008 | Yamauchi |
| 2008/0031537 A1 | 2/2008 | Gutkowicz-Krusin et al. |
| 2008/0049113 A1 | 2/2008 | Hirai |
| 2008/0056569 A1 | 3/2008 | Williams et al. |
| 2008/0122940 A1 | 5/2008 | Mori |
| 2008/0129728 A1 | 6/2008 | Satoshi |
| 2008/0144952 A1 | 6/2008 | Chen et al. |
| 2008/0152215 A1 | 6/2008 | Horie et al. |
| 2008/0168404 A1 | 7/2008 | Ording |
| 2008/0180792 A1 | 7/2008 | Georgiev |
| 2008/0187305 A1 | 8/2008 | Raskar et al. |
| 2008/0193026 A1 | 8/2008 | Horie et al. |
| 2008/0205871 A1 | 8/2008 | Utagawa |
| 2008/0226274 A1 | 9/2008 | Spielberg |
| 2008/0232680 A1 | 9/2008 | Berestov et al. |
| 2008/0253652 A1 | 10/2008 | Gupta et al. |
| 2008/0260291 A1 | 10/2008 | Alakarhu et al. |
| 2008/0266688 A1 | 10/2008 | Errando Smet et al. |
| 2008/0277566 A1 | 11/2008 | Utagawa |
| 2008/0309813 A1 | 12/2008 | Watanabe |
| 2008/0316301 A1 | 12/2008 | Givon |
| 2009/0027542 A1 | 1/2009 | Yamamoto et al. |
| 2009/0041381 A1 | 2/2009 | Georgiev et al. |
| 2009/0041448 A1 | 2/2009 | Georgiev et al. |
| 2009/0070710 A1 | 3/2009 | Kagaya |
| 2009/0128658 A1 | 5/2009 | Hayasaka et al. |
| 2009/0128669 A1 | 5/2009 | Ng et al. |
| 2009/0135258 A1 | 5/2009 | Nozaki |
| 2009/0140131 A1 | 6/2009 | Utagawa |
| 2009/0102956 A1 | 7/2009 | Georgiev |
| 2009/0185051 A1 | 7/2009 | Sano |
| 2009/0185801 A1 | 7/2009 | Georgiev et al. |
| 2009/0190022 A1 | 7/2009 | Ichimura |
| 2009/0190024 A1 | 7/2009 | Hayasaka et al. |
| 2009/0195689 A1 | 8/2009 | Hwang et al. |
| 2009/0202235 A1 | 8/2009 | Li et al. |
| 2009/0204813 A1 | 8/2009 | Kwan |
| 2009/0273843 A1 | 11/2009 | Raskar et al. |
| 2009/0295829 A1 | 12/2009 | Georgiev et al. |
| 2009/0309973 A1 | 12/2009 | Kogane |
| 2009/0310885 A1 | 12/2009 | Tamaru |
| 2009/0321861 A1 | 12/2009 | Oliver et al. |
| 2010/0003024 A1 | 1/2010 | Agrawal et al. |
| 2010/0021001 A1 | 1/2010 | Honsinger et al. |
| 2010/0026852 A1 | 2/2010 | Ng et al. |
| 2010/0050120 A1 | 2/2010 | Ohazama et al. |
| 2010/0060727 A1 | 3/2010 | Steinberg et al. |
| 2010/0097444 A1 | 4/2010 | Lablans |
| 2010/0103311 A1 | 4/2010 | Makii |
| 2010/0107068 A1 | 4/2010 | Butcher et al. |
| 2010/0111489 A1 | 5/2010 | Presler |
| 2010/0123784 A1 | 5/2010 | Ding et al. |
| 2010/0141780 A1 | 6/2010 | Tan et al. |
| 2010/0142839 A1 | 6/2010 | Lakus-Becker |
| 2010/0201789 A1 | 8/2010 | Yahagi |
| 2010/0253782 A1 | 10/2010 | Elazary |
| 2010/0265385 A1 | 10/2010 | Knight et al. |
| 2010/0277629 A1 | 11/2010 | Tanaka |
| 2010/0303288 A1 | 12/2010 | Malone |
| 2010/0328485 A1 | 12/2010 | Imamura et al. |
| 2011/0018903 A1 | 1/2011 | Lapstun et al. |
| 2011/0019056 A1 | 1/2011 | Hirsch et al. |
| 2011/0025827 A1 | 2/2011 | Shpunt et al. |
| 2011/0050864 A1 | 3/2011 | Bond |
| 2011/0050909 A1 | 3/2011 | Ellenby |
| 2011/0069175 A1 | 3/2011 | Mistretta et al. |
| 2011/0075729 A1 | 3/2011 | Dane et al. |
| 2011/0090255 A1 | 4/2011 | Wilson et al. |
| 2011/0123183 A1 | 5/2011 | Adelsberger et al. |
| 2011/0129120 A1 | 6/2011 | Chan |
| 2011/0129165 A1 | 6/2011 | Lim et al. |

(56) References Cited

U.S. PATENT DOCUMENTS

| | | |
|---|---|---|
| 2011/0148764 A1 | 6/2011 | Gao |
| 2011/0149074 A1 | 6/2011 | Lee et al. |
| 2011/0169994 A1 | 7/2011 | DiFrancesco et al. |
| 2011/0205384 A1 | 8/2011 | Zamowski et al. |
| 2011/0221947 A1 | 9/2011 | Awazu |
| 2011/0242334 A1 | 10/2011 | Wilburn et al. |
| 2011/0242352 A1 | 10/2011 | Hikosaka |
| 2011/0261164 A1 | 10/2011 | Olesen et al. |
| 2011/0261205 A1 | 10/2011 | Sun |
| 2011/0267263 A1 | 11/2011 | Hinckley |
| 2011/0267348 A1* | 11/2011 | Lin ................... G06T 15/20 345/426 |
| 2011/0273466 A1 | 11/2011 | Imai et al. |
| 2011/0133649 A1 | 12/2011 | Bales et al. |
| 2011/0292258 A1 | 12/2011 | Adler |
| 2011/0293179 A1* | 12/2011 | Dikmen ................. G06T 5/008 382/167 |
| 2011/0298960 A1 | 12/2011 | Tan et al. |
| 2011/0304745 A1 | 12/2011 | Wang et al. |
| 2011/0311046 A1 | 12/2011 | Oka |
| 2011/0316968 A1 | 12/2011 | Taguchi et al. |
| 2012/0014837 A1 | 1/2012 | Fehr et al. |
| 2012/0050562 A1 | 3/2012 | Perwass et al. |
| 2012/0056889 A1 | 3/2012 | Carter et al. |
| 2012/0057040 A1 | 3/2012 | Park et al. |
| 2012/0057806 A1 | 3/2012 | Backlund et al. |
| 2012/0062755 A1 | 3/2012 | Takahashi et al. |
| 2012/0132803 A1 | 5/2012 | Hirato et al. |
| 2012/0133746 A1 | 5/2012 | Bigioi et al. |
| 2012/0147205 A1 | 6/2012 | Lelescu et al. |
| 2012/0176481 A1 | 7/2012 | Lukk et al. |
| 2012/0188344 A1 | 7/2012 | Imai |
| 2012/0201475 A1 | 8/2012 | Carmel et al. |
| 2012/0206574 A1 | 8/2012 | Shikata et al. |
| 2012/0218463 A1 | 8/2012 | Benezra et al. |
| 2012/0224787 A1 | 9/2012 | Imai |
| 2012/0229691 A1 | 9/2012 | Hiasa et al. |
| 2012/0249529 A1 | 10/2012 | Matsumoto et al. |
| 2012/0249550 A1 | 10/2012 | Akeley |
| 2012/0249819 A1 | 10/2012 | Imai |
| 2012/0251131 A1 | 10/2012 | Henderson et al. |
| 2012/0257065 A1 | 10/2012 | Velarde et al. |
| 2012/0257795 A1 | 10/2012 | Kim et al. |
| 2012/0272271 A1 | 10/2012 | Nishizawa et al. |
| 2012/0287246 A1 | 11/2012 | Katayama |
| 2012/0287296 A1 | 11/2012 | Fukui |
| 2012/0287329 A1 | 11/2012 | Yahata |
| 2012/0293075 A1 | 11/2012 | Engelen et al. |
| 2012/0300091 A1 | 11/2012 | Shroff et al. |
| 2012/0237222 A9 | 12/2012 | Ng et al. |
| 2013/0002902 A1 | 1/2013 | Ito |
| 2013/0002936 A1 | 1/2013 | Hirama et al. |
| 2013/0021486 A1 | 1/2013 | Richardson |
| 2013/0038696 A1 | 2/2013 | Ding et al. |
| 2013/0041215 A1 | 2/2013 | McDowall |
| 2013/0044290 A1 | 2/2013 | Kawamura |
| 2013/0050546 A1 | 2/2013 | Kano |
| 2013/0064453 A1 | 3/2013 | Nagasaka et al. |
| 2013/0064532 A1 | 3/2013 | Caldwell et al. |
| 2013/0070059 A1 | 3/2013 | Kushida |
| 2013/0070060 A1 | 3/2013 | Chatterjee et al. |
| 2013/0077880 A1 | 3/2013 | Venkataraman et al. |
| 2013/0082905 A1 | 4/2013 | Ranieri et al. |
| 2013/0088616 A1 | 4/2013 | Ingrassia, Jr. |
| 2013/0093844 A1 | 4/2013 | Shuto |
| 2013/0093859 A1 | 4/2013 | Nakamura |
| 2013/0094101 A1 | 4/2013 | Oguchi |
| 2013/0107085 A1 | 5/2013 | Ng et al. |
| 2013/0113981 A1 | 5/2013 | Knight et al. |
| 2013/0120356 A1 | 5/2013 | Georgiev et al. |
| 2013/0120605 A1 | 5/2013 | Georgiev et al. |
| 2013/0120636 A1 | 5/2013 | Baer |
| 2013/0121577 A1* | 5/2013 | Wang ................... G06T 7/20 382/173 |
| 2013/0127901 A1 | 5/2013 | Georgiev et al. |
| 2013/0128052 A1 | 5/2013 | Catrein et al. |
| 2013/0128081 A1 | 5/2013 | Georgiev et al. |
| 2013/0128087 A1 | 5/2013 | Georgiev et al. |
| 2013/0129213 A1* | 5/2013 | Shechtman ........... G06T 7/0028 382/167 |
| 2013/0135448 A1 | 5/2013 | Nagumo et al. |
| 2013/0176481 A1 | 7/2013 | Holmes et al. |
| 2013/0188068 A1 | 7/2013 | Said |
| 2013/0215108 A1 | 8/2013 | McMahon et al. |
| 2013/0215226 A1 | 8/2013 | Chauvier et al. |
| 2013/0222656 A1 | 8/2013 | Kaneko |
| 2013/0234935 A1 | 9/2013 | Griffith |
| 2013/0242137 A1 | 9/2013 | Kirkland |
| 2013/0258451 A1 | 10/2013 | El-Ghoroury et al. |
| 2013/0262511 A1 | 10/2013 | Kuffner et al. |
| 2013/0286236 A1 | 10/2013 | Mankowski |
| 2013/0321574 A1 | 12/2013 | Zhang et al. |
| 2013/0321581 A1 | 12/2013 | El-Ghoroury |
| 2013/0321677 A1 | 12/2013 | Cote et al. |
| 2013/0329107 A1 | 12/2013 | Burley et al. |
| 2013/0329132 A1 | 12/2013 | Tico et al. |
| 2013/0335596 A1 | 12/2013 | Demandoix et al. |
| 2013/0342526 A1 | 12/2013 | Ng et al. |
| 2013/0342700 A1 | 12/2013 | Kass |
| 2014/0002502 A1 | 1/2014 | Han |
| 2014/0002699 A1 | 1/2014 | Guan |
| 2014/0003719 A1 | 1/2014 | Bai et al. |
| 2014/0013273 A1 | 1/2014 | Ng |
| 2014/0035959 A1 | 2/2014 | Lapstun |
| 2014/0037280 A1 | 2/2014 | Shirakawa |
| 2014/0049663 A1 | 2/2014 | Ng et al. |
| 2014/0059462 A1 | 2/2014 | Wernersson |
| 2014/0085282 A1 | 3/2014 | Luebke et al. |
| 2014/0092424 A1 | 4/2014 | Grosz |
| 2014/0098191 A1 | 4/2014 | Rime et al. |
| 2014/0132741 A1 | 5/2014 | Aagaard et al. |
| 2014/0133749 A1 | 5/2014 | Kuo et al. |
| 2014/0139538 A1 | 5/2014 | Barber et al. |
| 2014/0167196 A1 | 6/2014 | Heimgartner et al. |
| 2014/0176540 A1 | 6/2014 | Tosic et al. |
| 2014/0176592 A1 | 6/2014 | Wilburn et al. |
| 2014/0176710 A1 | 6/2014 | Brady |
| 2014/0177905 A1 | 6/2014 | Grefalda |
| 2014/0184885 A1 | 7/2014 | Tanaka et al. |
| 2014/0192208 A1 | 7/2014 | Okincha |
| 2014/0193047 A1 | 7/2014 | Grosz |
| 2014/0195921 A1 | 7/2014 | Grosz |
| 2014/0204111 A1 | 7/2014 | Vaidyanathan et al. |
| 2014/0211077 A1 | 7/2014 | Ng et al. |
| 2014/0218540 A1 | 8/2014 | Geiss et al. |
| 2014/0226038 A1 | 8/2014 | Kimura |
| 2014/0240463 A1 | 8/2014 | Pitts et al. |
| 2014/0240578 A1 | 8/2014 | Fishman et al. |
| 2014/0267243 A1 | 9/2014 | Venkataraman et al. |
| 2014/0267639 A1 | 9/2014 | Tatsuta |
| 2014/0300753 A1 | 10/2014 | Yin |
| 2014/0313350 A1 | 10/2014 | Keelan |
| 2014/0313375 A1 | 10/2014 | Milnar |
| 2014/0340390 A1 | 11/2014 | Lanman et al. |
| 2014/0347540 A1 | 11/2014 | Kang |
| 2014/0354863 A1 | 12/2014 | Ahn et al. |
| 2014/0368494 A1 | 12/2014 | Sakharnykh et al. |
| 2014/0368640 A1 | 12/2014 | Strandemar et al. |
| 2015/0062178 A1 | 3/2015 | Matas et al. |
| 2015/0062386 A1 | 3/2015 | Sugawara |
| 2015/0092071 A1 | 4/2015 | Meng et al. |
| 2015/0097985 A1 | 4/2015 | Akeley |
| 2015/0104101 A1 | 4/2015 | Bryant et al. |
| 2015/0193937 A1 | 7/2015 | Georgiev et al. |
| 2015/0206340 A1 | 7/2015 | Munkberg et al. |
| 2015/0207990 A1 | 7/2015 | Ford et al. |
| 2015/0237273 A1 | 8/2015 | Sawadaishi |
| 2015/0310592 A1 | 10/2015 | Kano |
| 2015/0312553 A1 | 10/2015 | Ng et al. |
| 2015/0312593 A1 | 10/2015 | Akeley et al. |
| 2015/0370011 A1 | 12/2015 | Ishihara |
| 2015/0370012 A1 | 12/2015 | Ishihara |
| 2016/0029017 A1 | 1/2016 | Liang |
| 2016/0142615 A1 | 5/2016 | Liang |

(56) References Cited

U.S. PATENT DOCUMENTS

| | | |
|---|---|---|
| 2016/0155215 A1 | 6/2016 | Suzuki |
| 2016/0165206 A1 | 6/2016 | Huang et al. |
| 2016/0173844 A1 | 6/2016 | Knight et al. |
| 2016/0191823 A1 | 6/2016 | El-Ghoroury |
| 2016/0253837 A1 | 9/2016 | Zhu et al. |
| 2016/0269620 A1 | 9/2016 | Romanenko et al. |
| 2016/0307368 A1 | 10/2016 | Akeley |
| 2016/0307372 A1 | 10/2016 | Pitts et al. |
| 2016/0309065 A1 | 10/2016 | Karafin et al. |
| 2016/0353026 A1 | 12/2016 | Blonde et al. |
| 2016/0381348 A1 | 12/2016 | Hayasaka |
| 2017/0059305 A1 | 3/2017 | Nonn et al. |
| 2017/0061635 A1 | 3/2017 | Oberheu et al. |
| 2017/0067832 A1 | 3/2017 | Ferrara, Jr. et al. |
| 2017/0094906 A1 | 3/2017 | Liang et al. |
| 2017/0134639 A1 | 5/2017 | Pitts et al. |
| 2017/0139131 A1 | 5/2017 | Karafin et al. |
| 2017/0237971 A1 | 8/2017 | Pitts et al. |
| 2017/0243373 A1 | 8/2017 | Bevensee et al. |
| 2017/0244948 A1 | 8/2017 | Pang et al. |
| 2017/0256036 A1 | 9/2017 | Song et al. |
| 2017/0263012 A1 | 9/2017 | Sabater et al. |
| 2017/0302903 A1 | 10/2017 | Ng et al. |
| 2017/0365068 A1 | 12/2017 | Tan et al. |
| 2018/0012397 A1 | 1/2018 | Carothers |
| 2018/0020204 A1 | 1/2018 | Pang et al. |
| 2018/0033209 A1 | 2/2018 | Akeley et al. |
| 2018/0034134 A1 | 2/2018 | Pang et al. |
| 2018/0070066 A1 | 3/2018 | Knight et al. |
| 2018/0070067 A1 | 3/2018 | Knight et al. |
| 2018/0082405 A1 | 3/2018 | Liang |
| 2018/0089903 A1 | 3/2018 | Pang et al. |
| 2018/0097867 A1 | 4/2018 | Pang et al. |
| 2018/0158198 A1 | 6/2018 | Karnad |

FOREIGN PATENT DOCUMENTS

| | | |
|---|---|---|
| DE | 19624421 | 1/1997 |
| JP | 2010020100 | 1/2010 |
| JP | 2011135170 | 7/2011 |
| WO | 2003052465 | 6/2003 |
| WO | 2006039486 | 4/2006 |
| WO | 2007092545 | 8/2007 |
| WO | 2007092581 | 8/2007 |
| WO | 2011010234 | 3/2011 |
| WO | 2011029209 | 3/2011 |
| WO | 2011081187 | 7/2011 |

OTHER PUBLICATIONS

Ogden, J., "Pyramid-Based Computer Graphics", 1985.
Okano et al., "Three-dimensional video system based on integral photography" Optical Engineering, Jun. 1999. vol. 38, No. 6, pp. 1072-1077.
Orzan, Alexandrina, et al., "Diffusion Curves: A Vector Representation for Smooth-Shaded Images," ACM Transactions on Graphics—Proceedings of SIGGRAPH 2008; vol. 27; 2008.
Pain, B., "Back-Side Illumination Technology for SOI-CMOS Image Sensors", 2009.
Perez, Patrick et al., "Poisson Image Editing," ACM Transactions on Graphics—Proceedings of ACM SIGGRAPH 2003; vol. 22, Issue 3; Jul. 2003; pp. 313-318.
Petschnigg, George, et al., "Digial Photography with Flash and No-Flash Image Pairs", SIGGRAPH 2004.
Primesense, "The Primesense 3D Awareness Sensor", 2007.
Ramamoorthi, R., et al, "Frequency space environment map rendering" ACM Transactions on Graphics (SIGGRAPH 2002 proceedings) 21, 3, 517-526.
Ramamoorthi, R., et al., "An efficient representation for irradiance environment maps", in Proceedings of SIGGRAPH 2001, 497-500.
Raskar, Ramesh et al., "Glare Aware Photography: 4D Ray Sampling for Reducing Glare Effects of Camera Lenses," ACM Transactions on Graphics—Proceedings of ACM SIGGRAPH, Aug. 2008; vol. 27, Issue 3; pp. 1-10.
Raskar, Ramesh et al., "Non-photorealistic Camera: Depth Edge Detection and Stylized Rendering using Multi-Flash Imaging", SIGGRAPH 2004.
Raytrix, "Raytrix Lightfield Camera," Raytrix GmbH, Germany 2012, pp. 1-35.
Roper Scientific, Germany "Fiber Optics," 2012.
Scharstein, Daniel, et al., "High-Accuracy Stereo Depth Maps Using Structured Light," CVPR'03 Proceedings of the 2003 IEEE Computer Society, pp. 195-202.
Schirmacher, H. et al., "High-Quality Interactive Lumigraph Rendering Through Warping," May 2000, Graphics Interface 2000.
Shreiner, OpenGL Programming Guide, 7th edition, Chapter 8, 2010.
Simpleviewer, "Tiltview", http://simpleviewer.net/tiltviewer. Retrieved Jan. 2013.
Skodras, A. et al., "The JPEG 2000 Still Image Compression Standard," Sep. 2001, IEEE Signal Processing Magazine, pp. 36-58.
Sloan, P., et al., "Precomputed radiance transfer for real-time rendering in dynamic, low-frequency lighting environments", ACM Transactions on Graphics 21, 3, 527-536, 2002.
Snavely, Noah, et al., "Photo-tourism: Exploring Photo collections in 3D", ACM Transactions on Graphics (SIGGRAPH Proceedings), 2006.
Sokolov, "Autostereoscopy and Integral Photography by Professor Lippmann's Method", 1911, pp. 23-29.
Sony Corp, "Interchangeable Lens Digital Camera Handbook", 2011.
Sony, Sony's First Curved Sensor Photo: http://www.engadget.com; Jul. 2014.
Stensvold, M., "Hybrid AF: A New Approach to Autofocus Is Emerging for both Still and Video", Digital Photo Magazine, Nov. 13, 2012.
Story, D., "The Future of Photography", Optics Electronics, Oct. 2008.
Sun, Jian, et al., "Stereo Matching Using Belief Propagation", 2002.
Tagging photos on Flickr, Facebook and other online photo sharing sites (see, for example, http://support.gnip.com/customer/portal/articles/809309-flickr-geo-photos-tag-search). Retrieved Jan. 2013.
Takahashi, Keita, et al., "All in-focus View Synthesis from Under-Sampled Light Fields", ICAT 2003, Tokyo, Japan.
Tanida et al., "Thin observation module by bound optics (TOMBO): concept and experimental verification" Applied Optics 40, 11 (Apr. 10, 2001), pp. 1806-1813.
Tao, Michael, et al., "Depth from Combining Defocus and Correspondence Using Light-Field Cameras", Dec. 2013.
Techcrunch, "Coolinis", Retrieved Jan. 2013.
Teo, P., et al., "Efficient linear rendering for interactive light design", Tech. Rep. STAN-CS-TN-97-60, 1998, Stanford University.
Teranishi, N. "Evolution of Optical Structure in Images Sensors," Electron Devices Meeting (IEDM) 2012 IEEE International; Dec. 10-13, 2012.
Vaish et al., "Using plane + parallax for calibrating dense camera arrays", In Proceedings CVPR 2004, pp. 2-9.
Vaish, V., et al., "Synthetic Aperture Focusing Using a Shear-Warp Factorization of the Viewing Transform," Workshop on Advanced 3D Imaging for Safety and Security (in conjunction with CVPR 2005), 2005.
VR Playhouse, "The Surrogate," http://www.vrplayhouse.com/the-surrogate.
Wanner, S. et al., "Globally Consistent Depth Labeling of 4D Light Fields," IEEE Conference on Computer Vision and Pattern Recognition, 2012.
Wanner, S. et al., "Variational Light Field Analysis for Disparity Estimation and Super-Resolution," IEEE Transactions on Pattern Analysis and Machine Intellegence, 2013.
Wenger, et al, "Performance Relighting and Reflectance Transformation with Time-Multiplexed Illumination", Institute for Creative Technologies, SIGGRAPH 2005.

(56) References Cited

OTHER PUBLICATIONS

Wetzstein, Gordon, et al., "Sensor Saturation in Fourier Multiplexed Imaging", IEEE Conference on Computer Vision and Pattern Recognition (2010).
Wikipedia—Adaptive Optics: http://en.wikipedia.org/wiki/adaptive_optics. Retrieved Feb. 2014.
Wikipedia—Autofocus systems and methods: http://en.wikipedia.org/wiki/Autofocus. Retrieved Jan. 2013.
Wikipedia—Bayer Filter: http:/en.wikipedia.org/wiki/Bayer_filter. Retrieved Jun. 20, 2013.
Wikipedia—Color Image Pipeline: http://en.wikipedia.org/wiki/color_image_pipeline. Retrieved Jan. 15, 2014.
Wikipedia—Compression standard JPEG XR: http://en.wikipedia.org/wiki/JPEG_XR. Retrieved Jan. 2013.
Wikipedia—CYGM Filter: http://en.wikipedia.org/wiki/CYGM_filter. Retrieved Jun. 20, 2013.
Wikipedia—Data overlay techniques for real-time visual feed. For example, heads-up displays: http://en.wikipedia.org/wiki/Head-up_display. Retrieved Jan. 2013.
Wikipedia—Exchangeable image file format: http://en.wikipedia.org/wiki/Exchangeable_image_file_format. Retrieved Jan. 2013.
Wikipedia—Expeed: http://en.wikipedia.org/wiki/EXPEED. Retrieved Jan. 15, 2014.
Wikipedia—Extensible Metadata Platform: http://en.wikipedia.org/wiki/Extensible_Metadata_Platform. Retrieved Jan. 2013.
Wikipedia—Key framing for video animation: http://en.wikipedia.org/wiki/Key_frame. Retrieved Jan. 2013.
Wikipedia—Lazy loading of image data: http://en.wikipedia.org/wiki/Lazy_loading. Retrieved Jan. 2013.
Wikipedia—Methods of Variable Bitrate Encoding: http://en.wikipedia.org/wiki/Variable_bitrate#Methods_of_VBR_encoding. Retrieved Jan. 2013.
Wikipedia—Portable Network Graphics format: http://en.wikipedia.org/wiki/Portable_Network_Graphics. Retrieved Jan. 2013.
Wikipedia—Unsharp Mask Technique: https://en.wikipedia.org/wiki/Unsharp_masking. Retrieved May 3, 2016.
Wilburn et al., "High Performance Imaging using Large Camera Arrays", ACM Transactions on Graphics (TOG), vol. 24, Issue 3 (Jul. 2005), Proceedings of ACM SIGGRAPH 2005, pp. 765-776.
Wilburn, Bennett, et al., "High Speed Video Using a Dense Camera Array", 2004.
Wilburn, Bennett, et al., "The Light Field Video Camera", Proceedings of Media Processors 2002.
Williams, L. "Pyramidal Parametrics," Computer Graphic (1983).
Winnemoller, H., et al., "Light Waving: Estimating Light Positions From Photographs Alone", Eurographics 2005.
Wippermann, F. "Chirped Refractive Microlens Array," Dissertation 2007.
Wuu, S., et al., "A Manufacturable Back-Side Illumination Technology Using Bulk Si Substrate for Advanced CMOS Image Sensors", 2009 International Image Sensor Workshop, Bergen, Norway.
Wuu, S., et al., "BSI Technology with Bulk Si Wafer", 2009 International Image Sensor Workshop, Bergen, Norway.
Xiao, Z. et al., "Aliasing Detection and Reduction in Plenoptic Imaging," IEEE Conference on Computer Vision and Pattern Recognition; 2014.
Xu, Xin et al., "Robust Automatic Focus Algorithm for Low Contrast Images Using a New Contrast Measure," Sensors 2011; 14 pages.
Zheng, C. et al., "Parallax Photography: Creating 3D Cinematic Effects from Stills", Proceedings of Graphic Interface, 2009.
Zitnick, L. et al., "High-Quality Video View Interpolation Using a Layered Representation," Aug. 2004; ACM Transactions on Graphics (TOG), Proceedings of ACM SIGGRAPH 2004; vol. 23, Issue 3; pp. 600-608.
Zoberbier, M., et al., "Wafer Cameras—Novel Fabrication and Packaging Technologies", 2009 International Image Senor Workshop, Bergen, Norway, 5 pages.

Agarwala, A., et al., "Interactive Digital Photomontage," ACM Transactions on Graphics, Proceedings of SIGGRAPH 2004, vol. 32, No. 3, 2004.
Munkberg, Jacob, et al., "Layered Reconstruction for Defocus and Motion Blur", EGSR 2014, pp. 1-12.
Shade, Jonathan, et al., "Layered Depth Images", SIGGRAPH 98, pp. 1-2.
Georgiev, T., et al., "Suppersolution with Plenoptic 2.0 Cameras," Optical Society of America 2009; pp. 1-3.
Georgiev, T., et al., "Unified Frequency Domain Analysis of Lightfield Cameras" (2008).
Georgiev, T., et al., Plenoptic Camera 2.0 (2008).
Girod, B., "Mobile Visual Search", IEEE Signal Processing Magazine, Jul. 2011.
Gortler et al., "The lumigraph" SIGGRAPH 96, pp. 43-54.
Groen et al., "A Comparison of Different Focus Functions for Use in Autofocus Algorithms," Cytometry 6:81-91, 1985.
Haeberli, Paul "A Multifocus Method for Controlling Depth of Field" GRAPHICA Obscura, 1994, pp. 1-3.
Heide, F. et al., "High-Quality Computational Imaging Through Simple Lenses," ACM Transactions on Graphics, SIGGRAPH 2013; pp. 1-7.
Heidelberg Collaboratory for Image Processing, "Consistent Depth Estimation in a 4D Light Field," May 2013.
Hirigoyen, F., et al., "1.1 um Backside Imager vs. Frontside Image: an optics-dedicated FDTD approach", IEEE 2009 International Image Sensor Workshop.
Huang, Fu-Chung et al., "Eyeglasses-free Display: Towards Correcting Visual Aberrations with Computational Light Field Displays," ACM Transaction on Graphics, Aug. 2014, pp. 1-12.
Isaksen, A., et al., "Dynamically Reparameterized Light Fields," SIGGRAPH 2000, pp. 297-306.
Ives H., "Optical properties of a Lippman lenticulated sheet," J. Opt. Soc. Am. 21, 171 (1931).
Ives, H. "Parallax Panoramagrams Made with a Large Diameter Lens", Journal of the Optical Society of America; 1930.
Jackson et al., "Selection of a Convolution Function for Fourier Inversion Using Gridding" IEEE Transactions on Medical Imaging, Sep. 1991, vol. 10, No. 3, pp. 473-478.
Kautz, J., et al., "Fast arbitrary BRDF shading for low-frequency lighting using spherical harmonics", in Eurographic Rendering Workshop 2002, 291-296.
Koltun, et al., "Virtual Occluders: An Efficient Interediate PVS Representation", Rendering Techniques 2000: Proc. 11th Eurographics Workshop Rendering, pp. 59-70, Jun. 2000.
Kopf, J., et al., Deep Photo: Model-Based Photograph Enhancement and Viewing, SIGGRAPH Asia 2008.
Lehtinen, J., et al. "Matrix radiance transfer", in Symposium on Interactive 3D Graphics, 59-64, 2003.
Lesser, Michael, "Back-Side Illumination", 2009.
Levin, A., et al., "Image and Depth from a Conventional Camera with a Coded Aperture", SIGGRAPH 2007, pp. 1-9.
Levoy et al.,"Light Field Rendering" SIGGRAPH 96 Proceeding, 1996. pp. 31-42.
Levoy, "Light Fields and Computational Imaging" IEEE Computer Society, Aug. 2006, pp. 46-55.
Levoy, M. "Light Field Photography and Videography," Oct. 18, 2005.
Levoy, M. "Stanford Light Field Microscope Project," 2008; http://graphics.stanford.edu/projects/lfmicroscope/, 4 pages.
Levoy, M., "Autofocus: Contrast Detection", http://graphics.stanford.edu/courses/cs178/applets/autofocusPD.html, pp. 1-3, 2010.
Levoy, M., "Autofocus: Phase Detection", http://graphics.stanford.edu/courses/cs178/applets/autofocusPD.html, pp. 1-3, 2010.
Levoy, M., et al., "Light Field Microscopy," ACM Transactions on Graphics, vol. 25, No. 3, Proceedings SIGGRAPH 2006.
Liang, Chia-Kai, et al., "Programmable Aperture Photography: Multiplexed Light Field Acquisition", ACM SIGGRAPH, 2008.
Lippmann, "Reversible Prints", Communication at the French Society of Physics, Journal of Physics, 7 , 4, Mar. 1908, pp. 821-825.
Lumsdaine et al., "Full Resolution Lightfield Rendering" Adobe Technical Report Jan. 2008, pp. 1-12.

(56) References Cited

OTHER PUBLICATIONS

Maeda, Y. et al., "A CMOS Image Sensor with Pseudorandom Pixel Placement for Clear Imaging," 2009 International Symposium on Intelligent Signal Processing and Communication Systems, Dec. 2009.
Magnor, M. et al., "Model-Aided Coding of Multi-Viewpoint Image Data," Proceedings IEEE Conference on Image Processing, ICIP-2000, Vancouver, Canada, Sep. 2000. https://graphics.tu-bs.de/static/people/magnor/publications/icip00.pdf.
Mallat, Stephane, "A Wavelet Tour of Signal Processing", Academic Press 1998.
Malzbender, et al., "Polynomial Texture Maps", Proceedings SIGGRAPH 2001.
Marshall, Richard J. et al., "Improving Depth Estimation from a Plenoptic Camera by Patterned Illumination," Proc. of SPIE, vol. 9528, 2015, pp. 1-6.
Masselus, Vincent, et al., "Relighting with 4D Incident Light Fields", SIGGRAPH 2003.
Meynants, G., et al., "Pixel Binning in CMOS Image Sensors," Frontiers in Electronic Imaging Conference, 2009.
Moreno-Noguer, F. et al., "Active Refocusing of Images and Videos," ACM Transactions on Graphics, Aug. 2007; pp. 1-9.
Naemura et al., "3-D Computer Graphics based on Integral Photography" Optics Express, Feb. 12, 2001. vol. 8, No. 2, pp. 255-262.
Nakamura, J., "Image Sensors and Signal Processing for Digital Still Cameras" (Optical Science and Engineering), 2005.
National Instruments, "Anatomy of a Camera," pp. 1-5, Sep. 6, 2006.
Nayar, Shree, et al., "Shape from Focus", IEEE Transactions on Pattern Analysis and Machine Intelligence, vol. 16, No. 8, pp. 824-831, Aug. 1994.
Ng, R., et al. "Light Field Photography with a Hand-held Plenoptic Camera," Stanford Technical Report, CSTR 2005-2, 2005.
Ng, R., et al., "All-Frequency Shadows Using Non-linear Wavelet Lighting Approximation. ACM Transactions on Graphics," ACM Transactions on Graphics; Proceedings of SIGGRAPH 2003.
Ng, R., et al., "Triple Product Wavelet Integrals for All-Frequency Relighting", ACM Transactions on Graphics (Proceedings of SIGGRAPH 2004).
Ng, Yi-Ren, "Digital Light Field Photography," Doctoral Thesis, Standford University, Jun. 2006; 203 pages.
Ng., R., "Fourier Slice Photography," ACM Transactions on Graphics, Proceedings of SIGGRAPH 2005, vol. 24, No. 3, 2005, pp. 735-744.
Nguyen, Hubert. "Practical Post-Process Depth of Field." GPU Gems 3. Upper Saddle River, NJ: Addison-Wesley, 2008.
Nimeroff, J., et al., "Efficient rendering of naturally illuminatied environments" in Fifth Eurographics Workshop on Rendering, 359-373, 1994.
U.S. Appl. No. 15/967,076, filed Apr. 30, 2018 listing Jiantao Kuang et al. as inventors, entitled "Automatic Lens Flare Detection and Correction for Light-Field Images".
U.S. Appl. No. 15/666,298, filed Aug. 1, 2017 listing Yonggang Ha et al. as inventors, entitled "Focal Reducer With Controlled Optical Properties for Interchangeable Lens Light-Field Camera".
U.S. Appl. No. 15/590,808, filed May 9, 2017 listing Alex Song et al. as inventors, entitled "Adaptive Control for Immersive Experience Delivery".
U.S. Appl. No. 15/864,938, filed Jan. 8, 2018 listing Jon Karafin et al. as inventors, entitled "Motion Blur for Light-Field Images".
U.S. Appl. No. 15/703,553, filed Sep. 13, 2017 listing Jon Karafin et al. as inventors, entitled "4D Camera Tracking and Optical Stabilization".
U.S. Appl. No. 15/590,841, filed May 9, 2017 listing Kurt Akeley et al. as inventors, entitled "Vantage Generation and Interactive Playback".
U.S. Appl. No. 15/590,951, filed May 9, 2017 listing Alex Song et al. as inventors, entitled "Wedge-Based Light-Field Video Capture".
U.S. Appl. No. 15/944,551, filed Apr. 3, 2018 listing Zejing Wang et al. as inventors, entitled "Generating Dolly Zoom Effect Using Light Field Image Data".
U.S. Appl. No. 15/874,723, filed Jan. 18, 2018 listing Mark Weir et al. as inventors, entitled "Multi-Camera Navigation Interface".
U.S. Appl. No. 15/897,994, filed Feb. 15, 2018 listing Trevor Carothers et al. as inventors, entitled "Generation of Virtual Reality With 6 Degrees of Freesom From Limited Viewer Data".
U.S. Appl. No. 15/605,037, filed May 25, 2017 listing Zejing Wang et al. as inventors, entitled "Multi-View Back-Projection to a Light-Field".
U.S. Appl. No. 15/897,836, filed Feb. 15, 2018 listing Francois Bleibel et al. as inventors, entitled "Multi-View Contour Tracking".
U.S. Appl. No. 15/897,942, filed Feb. 15, 2018 listing Francois Bleibel et al. as inventors, entitled "Multi-View Contour Tracking With Grabcut".
Adelsberger, R. et al., "Spatially Adaptive Photographic Flash," ETH Zurich, Department of Computer Science, Technical Report 612, 2008, pp. 1-12.
Adelson et al., "Single Lens Stereo with a Plenoptic Camera" IEEE Translation on Pattern Analysis and Machine Intelligence, Feb. 1992. vol. 14, No. 2, pp. 99-106.
Adelson, E. H., and Bergen, J. R. 1991. The plenoptic function and the elements of early vision. In Computational Models of Visual Processing, edited by Michael S. Landy and J. Anthony Movshon. Cambridge, Mass.: mit Press.
Adobe Systems Inc, "XMP Specification", Sep. 2005.
Adobe, "Photoshop CS6 / in depth: Digital Negative (DNG)", http://www.adobe.com/products/photoshop/extend.displayTab2html. Retrieved Jan. 2013.
Andreas Observatory, Spectrograph Manual: IV. Flat-Field Correction, Jul. 2006.
Apple, "Apple iPad: Photo Features on the iPad", Retrieved Jan. 2013.
Bae, S., et al., "Defocus Magnification", Computer Graphics Forum, vol. 26, Issue 3 (Proc. of Eurographics 2007), pp. 1-9.
Belhumeur, Peter et al., "The Bas-Relief Ambiguity", International Journal of Computer Vision, 1997, pp. 1060-1066.
Belhumeur, Peter, et al., "The Bas-Relief Ambiguity", International Journal of Computer Vision, 1999, pp. 33-44, revised version.
Bhat, P. et al. "GradientShop: A Gradient-Domain Optimization Framework for Image and Video Filtering," SIGGRAPH 2010; 14 pages.
Bolles, R., et al., "Epipolar-Plane Image Analysis: An Approach to Determining Structure from Motion", International Journal of Computer Vision, 1, 7-55 (1987).
Bourke, Paul, "Image filtering in the Frequency Domain," pp. 1-9, Jun. 1998.
Canon, Canon Speedlite wireless flash system, User manual for Model 550EX, Sep. 1998.
Chai, Jin-Xang et al., "Plenoptic Sampling", ACM SIGGRAPH 2000, Annual Conference Series, 2000, pp. 307-318.
Chen, S. et al., "A CMOS Image Sensor with On-Chip Image Compression Based on Predictive Boundary Adaptation and Memoryless QTD Algorithm," Very Large Scalee Integration (VLSI) Systems, IEEE Transactions, vol. 19, Issue 4; Apr. 2011.
Chen, W., et al., "Light Field mapping: Efficient representation and hardware rendering of surface light fields", ACM Transactions on Graphics 21, 3, 447-456, 2002.
Cohen, Noy et al., "Enhancing the performance of the light field microscope using wavefront coding," Optics Express, vol. 22, issue 20; 2014.
Daly, D., "Microlens Arrays" Retrieved Jan. 2013.
Debevec, et al, "A Lighting Reproduction Approach to Live-Action Compoisting" Proceedings SIGGRAPH 2002.
Debevec, P., et al., "Acquiring the reflectance field of a human face", SIGGRAPH 2000.
Debevec, P., et al., "Recovering high dynamic radiance maps from photographs", SIGGRAPH 1997, 369-378.
Design of the xBox menu. Retrieved Jan. 2013.
Digital Photography Review, "Sony Announce new RGBE CCD," Jul. 2003.

(56) References Cited

OTHER PUBLICATIONS

Dorsey, J., et al., "Design and simulation of opera light and projection effects", in Computer Graphics (Proceedings of SIGGRAPH 91), vol. 25, 41-50.
Dorsey, J., et al., "Interactive design of complex time dependent lighting", IEEE Computer Graphics and Applications 15, (Mar. 2, 1995), 26-36.
Dowski et al., "Wavefront coding: a modern method of achieving high performance and/or low cost imaging systems" SPIE Proceedings, vol. 3779, Jul. 1999, pp. 137-145.
Dowski, Jr. "Extended Depth of Field Through Wave-Front Coding," Applied Optics, vol. 34, No. 11, Apr. 10, 1995; pp. 1859-1866.
Duparre, J. et al., "Micro-Optical Artificial Compound Eyes," Institute of Physics Publishing, Apr. 2006.
Eisemann, Elmar, et al., "Flash Photography Enhancement via Intrinsic Relighting", SIGGRAPH 2004.
Fattal, Raanan, et al., "Multiscale Shape and Detail Enhancement from Multi-light Image Collections", SIGGRAPH 2007.
Fernando, Randima, "Depth of Field—A Survey of Techniques," GPU Gems. Boston, MA; Addison-Wesley, 2004.
Fitzpatrick, Brad, "Camlistore", Feb. 1, 2011.
Fujifilm, Super CCD EXR Sensor by Fujifilm, brochure reference No. EB-807E, 2008.
Georgiev, T. et al., "Reducing Plenoptic Camera Artifacts," Computer Graphics Forum, vol. 29, No. 6, pp. 1955-1968; 2010.
Georgiev, T., et al., "Spatio-Angular Resolution Tradeoff in Integral Photography," Proceedings of Eurographics Symposium on Rendering, 2006.
International Preliminary Report on Patentability dated Dec. 20, 2018 for corresponding International Application No. PCT/US2017/035148, 10 pages.

\* cited by examiner

| $T_j(p)$ | $TF_j(p)$ = Foreground | $TF_j(p)$ = Background | $TF_j(p)$ = Unknown |
|---|---|---|---|
| $TB_j(p)$ = Foreground | Foreground | Unknown | Unknown |
| $TB_j(p)$ = Background | Unknown | Background | Unknown |
| $TB_j(p)$ = Unknown | Foreground | Background | Unknown |

*FIG. 12*

| $T_j(p)$ | $TF_j(p)$ = Foreground | $TF_j(p)$ = Background | $TF_j(p)$ = Unknown |
|---|---|---|---|
| $TB_j(p)$ = Foreground | Foreground | Unknown | Foreground |
| $TB_j(p)$ = Background | Unknown | Background | Background |
| $TB_j(p)$ = Unknown | Unknown | Unknown | Unknown |

*FIG. 13*

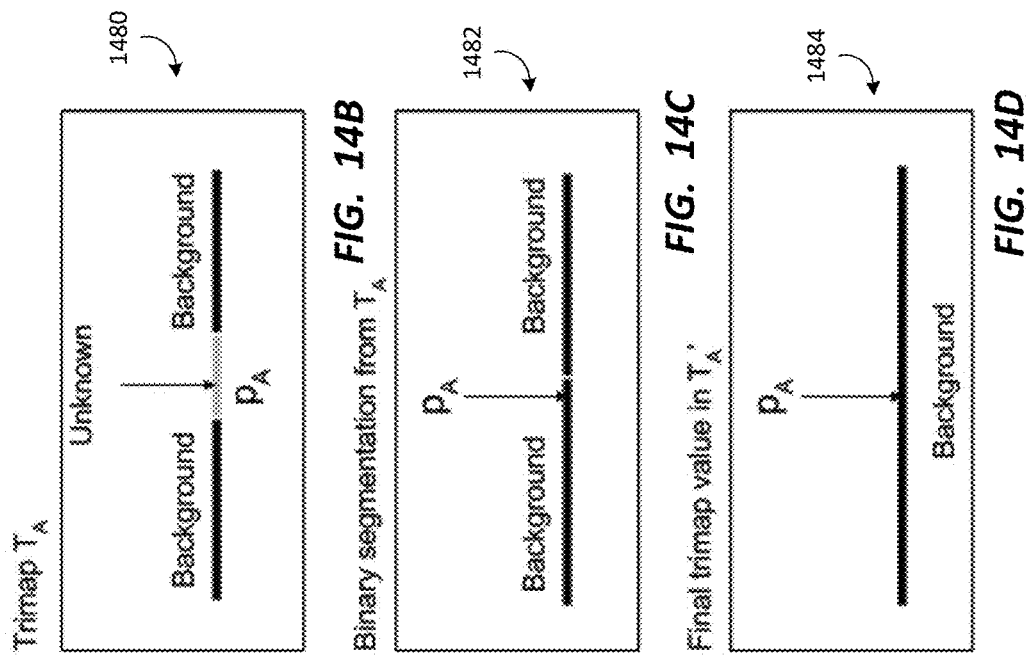
FIG. 14B
FIG. 14C
FIG. 14D
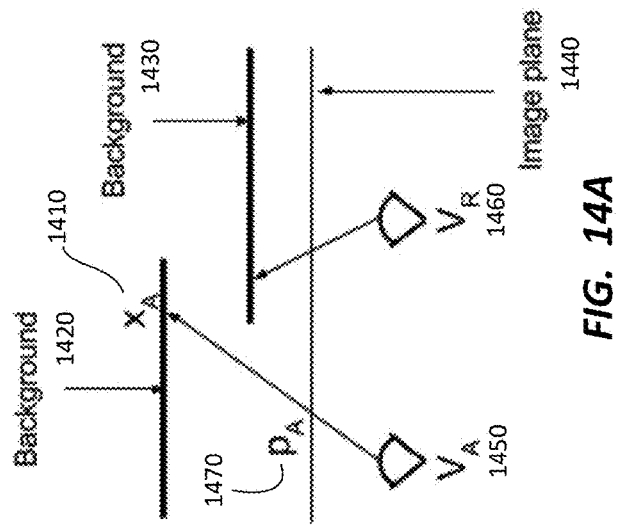
FIG. 14A

MULTI-VIEW SCENE SEGMENTATION AND PROPAGATION

CROSS-REFERENCE TO RELATED APPLICATIONS

The present application claims the benefit of U.S. Provisional Application Ser. No. 62/347,734 for "Using Light-Field Image Data for Background Color Spill Suppression", filed Jun. 9, 2016, the disclosure of which is incorporated herein by reference in its entirety.

The present application is related to U.S. application Ser. No. 14/837,465 for "Depth-Based Application of Image Effects", filed Aug. 27, 2015, the disclosure of which is incorporated herein by reference in its entirety.

The present application is related to U.S. Utility application Ser. No. 15/084,326 for "Capturing Light-Field Volume Images and Video Data Using Tiled Light-Field Cameras", filed on Mar. 29, 2016, the disclosure of which is incorporated herein by reference in its entirety.

TECHNICAL FIELD

The present disclosure relates to systems and methods for processing image data, and more specifically, to systems and methods for segmenting scenes in light-field images and/or volumetric video captured for use in virtual reality or augmented reality applications.

BACKGROUND

Editing conventional or light-field images to provide effects, such as changing colorization, changing contrast, or inserting and/or removing objects in the image, can be challenging. Typically, the user must employ careful selection of object boundaries to control how the effects are applied. Accordingly, application of depth-based effects can be a time-consuming and labor-intensive effort.

A further challenge is presented by the need to make depth-based modifications, such as background replacement, to video. The process of drawing a distinction between foreground and background elements can rapidly grow cumbersome when multiple frames are involved. Known methods for automating such segmentation are significantly limited. For example, edge detection and alpha estimation in the edge regions rely on separating background and foreground colors, which is inaccurate in low contrast areas or where the foreground and background colors are similar.

The challenge is compounded in the case of video with multiple viewpoints, as with a light-field camera or a tiled camera array. If segmentation is required for each view in the video stream, then the process must be repeated accordingly. The result is a very labor-intensive process.

SUMMARY

According to various embodiments, the system and method of the technology described herein process image data, such as light-field image data, so as to implement various effects based on depth characteristics of the image data. Such effects may include, but are not limited to, replacing one or more objects, modifying an exposure level, modifying a contrast level, modifying a saturation level, modifying a color set of the image, and/or changing a background of the image data. Accurate extraction of foreground scene elements may enable more effective compositing and/or other visual effects, for example to allow a new background (and/or other elements) to be blended in while minimizing color spillage and other artifacts.

Specifically, a depth-based effect may be applied to a video stream to generate a modified video stream. User input may designate a boundary between a foreground region and a background region, at a different depth from the foreground region, of a reference image of the video stream. This may be done by using a bounding box or the like to designate the boundary. For example, a 3D bounding box may be used to designate a foreground region of the reference image as the portion of the image within the 3D bounding box. The portion of the image outside the 3D bounding box may be the background region.

Based on the user input, a reference mask may be generated to indicate the foreground region and the background region. The boundary may be refined to compute a refined boundary of a refined reference mask. The refined reference mask may optionally be a trimap that includes an unknown region between the foreground and background regions. The unknown region may contain pixels that may belong to either the background region or the foreground region. The unknown region may have an adaptive width that can be larger or smaller, based on a confidence level in whether the boundary is in the exact proper location. If desired, further refinements may be made to the unknown region, via further user input, the application of depth-based algorithms, and/or the application of color-based algorithms. Other views and/or frames may be analyzed in conjunction with the reference image to help determine whether the pixels of the unknown region belong to the foreground region or the background region.

The reference mask may be used to generate one or more non-reference masks that indicate the foreground and background regions for one or more non-reference images, different from the reference image, of the video stream. Thus, the reference mask (for example, the trimap) may be applied to a different view and/or a different frame to facilitate generation of the trimap for that frame. Trimaps may thus be propagated from one or more key frames, via forward propagation (forward in time) and/or backward propagation (backward in time). Similarly, a trimap may be propagated to a different view of the same frame as an image for which a trimap has been computed. Thus, trimaps may be computed for all views and/or frames of the video stream, without the user having to provide input for each frame and/or view.

The trimaps may be used to generate alpha mattes for each view and/or frame. The alpha mattes may be used to control how the effect is applied to the video stream. If the video stream is light-field video, the alpha mattes may optionally be back-projected to the light-field so that the light-field can be used to project new views with the alpha matte applied.

Thus, the modified video stream may be generated. The modified video stream may be displayed for a viewer, for example, as part of a virtual reality or augmented reality experience.

BRIEF DESCRIPTION OF THE DRAWINGS

The accompanying drawings illustrate several embodiments. Together with the description, they serve to explain the principles of the embodiments. One skilled in the art will recognize that the particular embodiments illustrated in the drawings are merely exemplary, and are not intended to limit scope.

FIG. 12 is a table depicting the combined trimap value if |i−j|<=|k−j|, according to one embodiment.

FIG. 13 is a table depicting the combined trimap value if |i−j|>|k−j|, according to one embodiment.

FIGS. 14A through 14D are a top view, preliminary trimap, binary segmentation, and final trimap for an adjacent (non-reference) view VA, according to one embodiment.

DEFINITIONS

Figure 1:
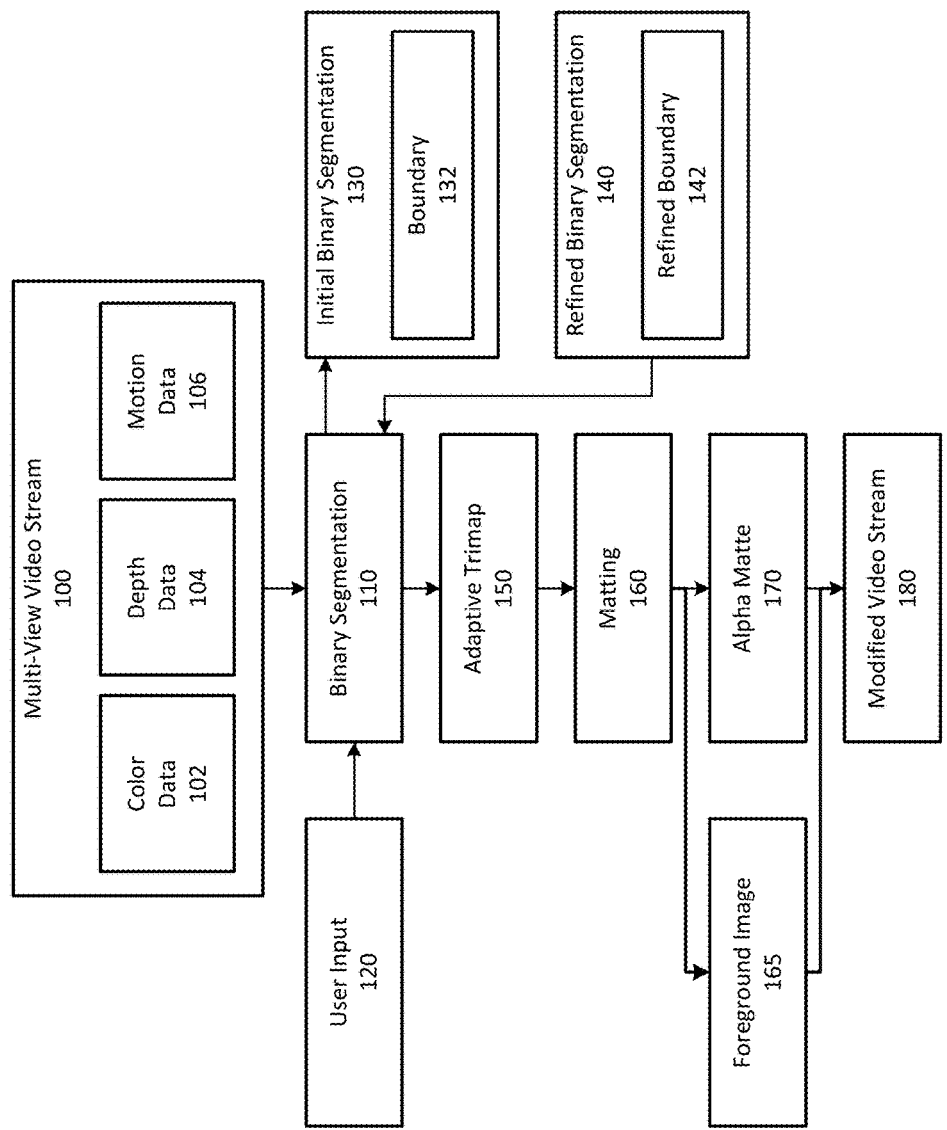
FIG. 1 is a diagram depicting a pipeline for carrying out video effect application, according to one embodiment.

For purposes of the description provided herein, the following definitions are used:

Alpha matte: output from an alpha matting process.

Alpha matting: a process for distinguishing between background and foreground pixels in an image, which may include assigning a degree of transparency to these pixels. The assigned transparency levels can be encoded for example, as an alpha channel associated with the image.

Background region"—a portion of an image that designates subject matter further from the camera.

Computing device: any device that contains a processor.

Data store: any device that stores digital data.

Depth: a representation of displacement between an object and/or corresponding image sample and a microlens array of a camera.

Depth map: a two-dimensional map corresponding to a light-field image, indicating a depth for each of multiple pixel samples within the light-field image.

Display screen: any type of hardware on which an image can be displayed.

Extended depth of field (EDOF) image: an image that has been processed to have objects in focus along a greater depth range.

Foreground segment, or "foreground region"—a portion of an image that designates subject matter closer to the camera.

Frame: a time designation for which one or more images of a scene have been captured as part of a video stream.

Image: a two-dimensional array of pixel values, or pixels, each specifying a color.

Input device: any device capable of receiving user input for a computing device

Light-field image: an image that contains a representation of light-field data captured at the sensor.

Microlens: a small lens, typically one in an array of similar microlenses.

Multi-view video stream: a video stream having multiple views for at least one frame.

Modified Video Stream: the resulting video stream after one or more effects are applied to a video stream.

Processor: any device that is capable of making decisions based on data.

Reference mask: any data structure, including trimaps, that indicates designation for each of multiple portions of an image.

Trimap: a reference mask designating regions of an image. The trimap may, for example, designate a foreground region, a background region, and an unknown region between the foreground and background regions.

Unknown region—a portion of an image containing pixels that may belong to the foreground region or the background region.

Video Stream: a series of images comprising frames at different times.

View: a viewpoint and/or view orientation from which a scene is viewed.

In addition, for ease of nomenclature, the term "camera" is used herein to refer to an image capture device or other data acquisition device. Such a data acquisition device can be any device or system for acquiring, recording, measuring, estimating, determining and/or computing data representative of a scene, including but not limited to two-dimensional image data, three-dimensional image data, and/or light-field data. Such a data acquisition device may include optics, sensors, and image processing electronics for acquiring data representative of a scene, using techniques that are well known in the art. One skilled in the art will recognize that many types of data acquisition devices can be used in connection with the present disclosure, and that the disclosure is not limited to cameras. Thus, the use of the term "camera" herein is intended to be illustrative and exemplary, but should not be considered to limit the scope of the disclosure. Specifically, any use of such term herein should be considered to refer to any suitable device for acquiring image data.

In the following description, several techniques and methods for processing light-field images are described. One skilled in the art will recognize that these various techniques and methods can be performed singly and/or in any suitable combination with one another.

Architecture

In at least one embodiment, the systems and methods described herein may be implemented in connection with light-field images captured by light-field capture devices including but not limited to those described in Ng et al., Light-field photography with a hand-held plenoptic capture device, Technical Report CSTR 2005 February, Stanford Computer Science. Exemplary light-field concepts, optical hardware, and computing hardware are shown and described in U.S. application Ser. No. 14/837,465 for "Depth-Based Application of Image Effects", filed Aug. 27, 2015, the disclosure of which is incorporated herein by reference in its entirety. The systems and methods described herein may be implemented on hardware disclosed therein, such as a light-field camera or a post-processing system that receives and processes light-field data.

Additionally or alternatively, the systems and methods described herein may be implemented in connection with volumetric video data, such as the video data captured by a tiled array of cameras. Exemplary camera array concepts, optical hardware, and computing hardware are shown and described in U.S. Utility application Ser. No. 15/084,326 for "Capturing Light-Field Volume Images and Video Data Using Tiled Light-Field Cameras", filed on Mar. 29, 2016, the disclosure of which is incorporated herein by reference in its entirety. The systems and methods described herein may be implemented the associated hardware, such as a tiled camera array or capture system, and/or a post-processing system that receives and processes the volumetric video data.

Effect Application

There are many effects that can beneficially be applied based on the depth of objects in the image. For example, it may be desirable to replace the background or foreground of an image, or to simulate the presence of an additional light source that only illuminates objects closer to or further from the camera.

Application of such effects can be challenging for a single image. Additional challenges are present for multi-view images such as light-field images or images captured by tiled camera arrays. These challenges are compounded when the changes are to be applied to multiple frames for presentation in video format, such as the video used in a virtual reality or augmented reality application.

The present disclosure provides systems and methods by which an image can be segmented based on depth. For example, in order to carry out background replacement, the image may be segmented into a foreground portion containing objects in the image foreground, a background portion containing objects in the image background, and/or an unknown portion containing objects that may be in the foreground and/or background of the image. The segmentation may then be propagated to images from alternative views and/or alternative frames in order to provide segmentation of a video stream. After segmentation, operations such as background replacement may be easily carried out.

Multi-View Segmentation Pipeline and Method

FIG. 1 is a diagram depicting a pipeline for carrying out video effect application, according to one embodiment. Effects may be applied to multi-view video such as light-field video and/or video captured with tiled camera arrays, as set forth previously. As shown, a video stream 100 may optionally be a multi-view video stream, and may include a plurality of images, each of which corresponds to a particular frame and/or view.

The video stream 100 may include various types of data, which may include, but are not limited to, color data 102, depth data 104, and motion data 106. The color data 102 may encode a color for each pixel of each image of the video stream 100, and may be in RGB or any other suitable format. The depth data 104 may include a depth map or other data structure that indicates the depth of various pixels and/or portions of each image of the video stream 100 from the image sensor that captured the video stream 100. The motion data 106 may indicate changes from the image(s) of each frame to the corresponding image(s) of succeeding frames.

One or more images of the video stream 100 may undergo segmentation, in which different segments of the video stream 100 are delineated to facilitate application of the effect. For example, the segmentation may be binary segmentation 110, in which an image is segmented into two segments, such as a foreground region showing objects relatively close to the camera, and a background region showing objects relatively further from the camera. User input 120 may be used to facilitate this delineation process.

Binary segmentation 110 may include, for each image, an initial binary segmentation 130, in which a boundary 132 is described between the foreground and background regions. Further, binary segmentation 110 may include, for each image, a refined binary segmentation 140 in which the boundary 132 is refined to take the form of a refined boundary 142 between the foreground and background regions.

The binary segmentation 110 may be used to construct a trimap 150, which may be an adaptive trimap for each image. The trimap 150 may be a map of the image that separates the images into the foreground and background regions, as well as an unknown region between the foreground and background regions. The unknown region may contain pixels that may appropriately be grouped with the foreground region or the background region. In some embodiments, the trimap 150 may be a mask that designates foreground (encoded, for example, as 255), background (encoded, for example, as 0) and unknown (encoded, for example, as 128) regions. The unknown region may define a swath of pixels about the boundaries separating foreground and background pixels where there is uncertainty about the foreground/background designation of individual pixels.

Matting 160 may be applied to the trimap 150, which may result in the generation of a foreground image 165, which may be an image that only represents the foreground region, and/or an alpha matte 170 indicating the extent to which the effect is to be applied to each image. The foreground image 165 and/or the alpha matte 170 may be used to apply the effect to the video stream 100, resulting in the generation of a modified video stream 180. Generation of the alpha matte 170 may be the primary goal of image segmentation.

In some implementations, the alpha matte 170 may be a floating-point image that identifies the parts of the image that belong to:

The foreground (alpha value of 1);
The background (alpha value of 0); and
The "soft" edge between the foreground and the background. Due to motion blur or material properties, some edge values will have partial transparency. In that case, an alpha value between 0 and 1 may be estimated.

Figure 2:
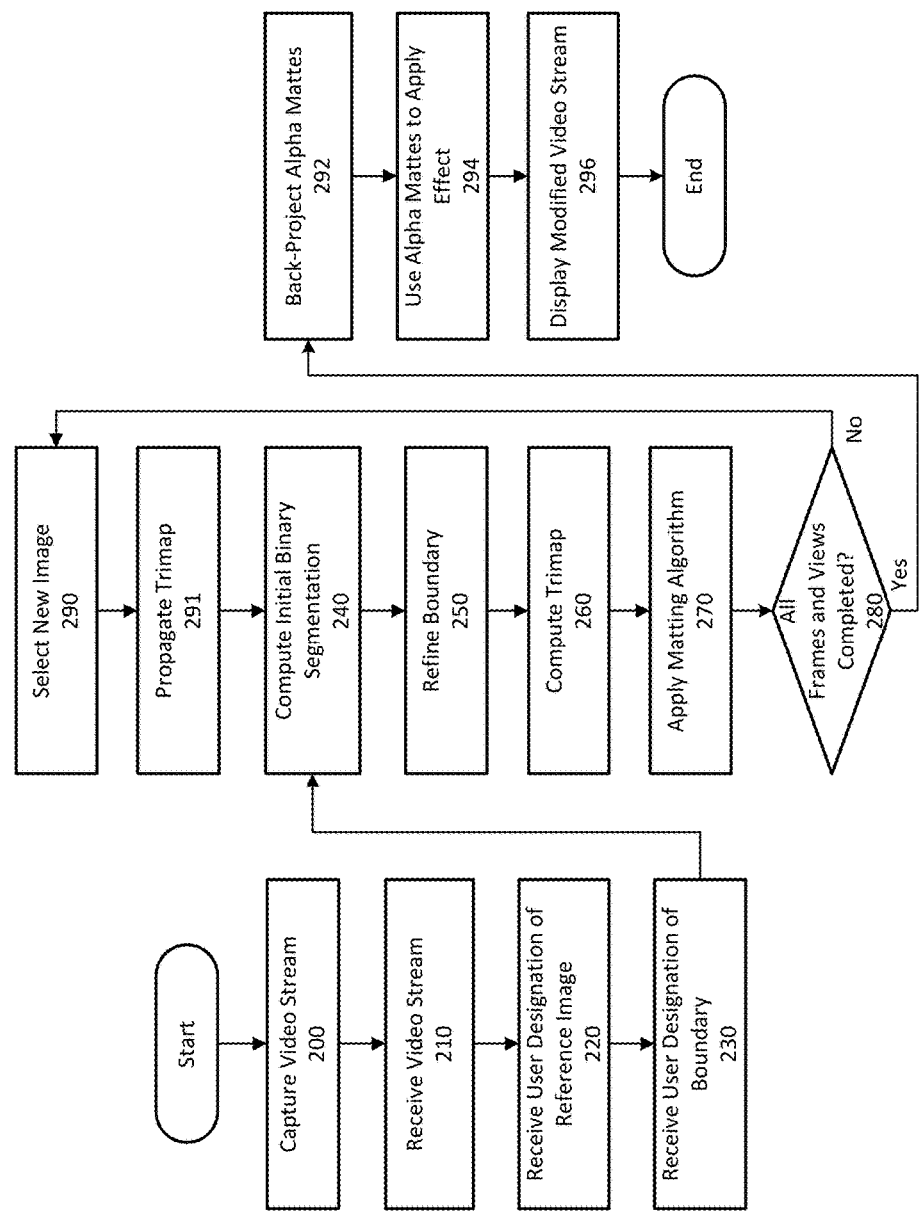
FIG. 2 is flow diagram depicting a method for carrying out video effect application, according to one embodiment.

FIG. 2 is a flow diagram depicting a method for carrying out video effect application, according to one embodiment. The method of FIG. 2 may optionally be carried out using the data structures shown in FIG. 1. Alternatively, the method of FIG. 2 may be performed with different data structures; similarly, the data structures of FIG. 1 may be used in connection with different methods from those of FIG. 2. The following description assumes that the method of FIG. 2 utilizes the data structures of FIG. 1.

The method of FIG. 2 may be performed, for example, with post-processing circuitry used to process light-field images and/or volumetric video data. In some embodiments, a computing device may carry out the method; such a computing device may include one or more of desktop computers, laptop computers, smartphones, tablets, cameras, and/or other devices that process digital information.

The method may start with a step 200 in which the video stream 100 is captured, for example, by the sensor of a camera, or camera array, as disclosed in the patent applications incorporated by reference herein. For light-field video capture, multiple views may be computed by refocusing the light-field at various locations of a virtual aperture. This may be done in one or more steps occurring after capture of the video stream 100.

In a step 210, the video stream 100 may be received in a computing device, which may be part of the camera or camera array. Alternatively, the computing device may be separate from the camera as in a separate post-processing system as disclosed in the patent applications incorporated by reference herein. Such a computing device will be referred to hereafter as a "system."

In a step 220, the system may receive a user designation of a reference image of the video stream 100, which is to be used for initial binary segmentation. The user may, for example, choose an image with clearly-defined and/or easily recognized foreground and background regions. In alternative embodiments, the reference image may be automatically selected by the system. In some embodiments, a depth or disparity map for each frame, and/or an optical flow image that records accurate motion for each pixel, may already have been computed for the reference image and/or other images of the video stream 100.

In a step 230, the system may receive user designation of a boundary between the foreground and background regions. This user designation may be made, for example, by the user drawing one or more elements, such as bounding boxes, around one or more elements in the foreground region and/or the background region. This user designation may be used in a step 240 to compute the initial binary segmentation 130 of FIG. 1.

Optionally, the elements drawn by the user may, collectively, make up the boundary 132. In a step 250, the boundary 132 may be refined to provide the refined boundary 142, thus providing the refined binary segmentation 140. If desired, graph cuts and/or other computer vision techniques may be used to define and/or refine the boundary 132 and/or the refined boundary 142. If desired, depth clues from the depth map for the reference image may be included in a probabilistic model to refine edges where background and foreground regions have similar colors.

In a step 260, the trimap 150 may be computed based on the refined binary segmentation 140. The trimap may include the unknown region between the foreground and background regions, as described above. In a step 270, a matting algorithm may be applied to the trimap 150 to generate the alpha matte 170 for the reference image. Color information from adjacent views may be used to separate the foreground and background components, thereby reducing the number of unknowns in the compositing equation and significantly improving the accuracy of the resulting alpha matte 170. In some embodiments, the alpha matte 170 may be a pixel-by-pixel map indicating a degree of transparency of each pixel of an image of the video stream 100. The alpha matte 170 may be encoded into an alpha channel for the video stream 100. Generation of the alpha matte 170 may involve the use, as inputs, of the color data 102 of the video stream 100, and the trimap 150.

In a query 280, a determination may be made as to whether all frames and views of the video stream 100 have been processed. If not, in a step 290, a new image (a "first non-reference image") may be selected, from a different frame and/or view from the reference image. In a step 291, the trimap 150 computed in the step 260 may be propagated to the new image. The step 240, the step 250, the step 260, and the step 270 may be repeated relative to the non-reference image, and successive non-reference images may be selected again in the step 290, and processed as described above, until the query 280 is answered in the affirmative.

In some embodiments, each non-reference image may be selected automatically by the system in the step 290, and may be processed without further user input in the step 240, the step 250, the step 260, and the step 270. In alternative embodiments, the user may provide input to select one or more of the new images pursuant to the step 290. If desired, the step 230 may also be repeated for each new image, so that the user provides input to facilitate proper generation of the initial binary segmentation 130.

In some embodiments, one or more of the step 240, the step 250, the step 260, and the step 270 may be omitted for each non-reference image. For example, the trimap 150 for the reference image may be used to compute the trimap 150, pursuant to the step 260, for the first non-reference image. This may be done without performing the step 240 and/or the step 250 for the new non-reference image.

Non-reference images may be selected such that they are from adjacent views and/or frames to those of previously processed images, so that the trimap 150 for an adjacent image can be used in the step 260 to generate the trimap 150 for a new non-reference image. Each trimap 150 to be generated may be extrapolated from the previous one, for example, by (1) applying optical flow between the new non-reference image and the previously processed image, and/or (2) using the depth data 104 in combination with the extrinsic parameters of the new non-reference image and/or the previously processed image.

In some embodiments, the step 240 and/or the step 250 may be performed only in-part. For example, the new trimap that has been propagated, in the step 291, for the new non-reference image may not be accurate for the new non-reference image due to motion and/or depth estimation errors; such inaccuracies may cause the matting algorithm to fail in the step 270. In order to address these inaccuracies, the step 240 and/or the step 250 may be performed only for the unknown region of the trimap 150 generated via extrapolation from that of the previously processed image. The step 260 and the step 270 may then be run to compute a revised trimap, which may lead to better functioning of the matting algorithm in the step 270.

Figure 3:
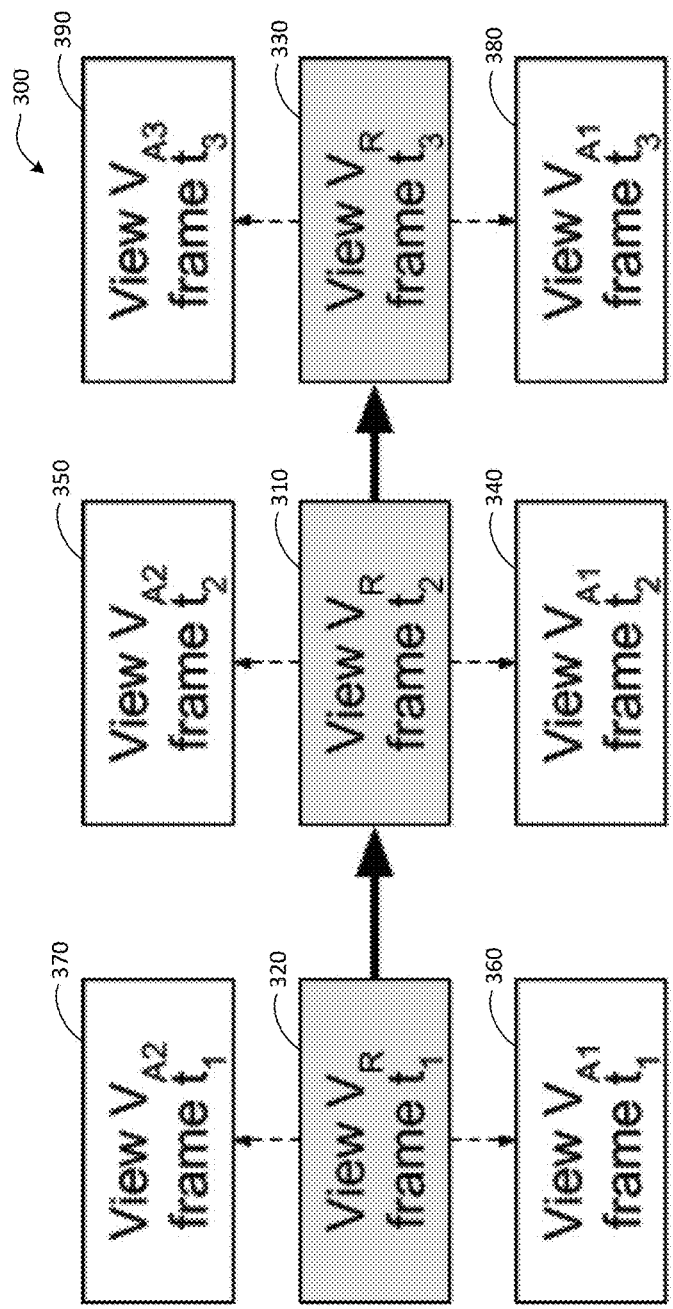
FIG. 3 is a diagram depicting propagation of segmentation to adjacent frames and/or views of the video stream, according to one embodiment.

FIG. 3 is a diagram 300 depicting propagation of segmentation to adjacent frames and/or views of the video stream 100, according to one embodiment. For example, from a reference image 310, segmentation may be propagated backward in time to an adjacent previous non-reference image 320, and/or forward in time to an adjacent subsequent non-reference image 330. Additionally or alternatively, from the reference image 310, segmentation may be propagated to a first adjacent view non-reference image 340 and/or a second adjacent view non-reference image 350.

Similarly, from the adjacent previous non-reference image 320, segmentation may be propagated to a first adjacent view non-reference image 360 and/or a second adjacent view non-reference image 370. From the adjacent subsequent non-reference image 330, segmentation may be propagated to a first adjacent view non-reference image 380 and/or a second adjacent view non-reference image 390.

Figure 4:
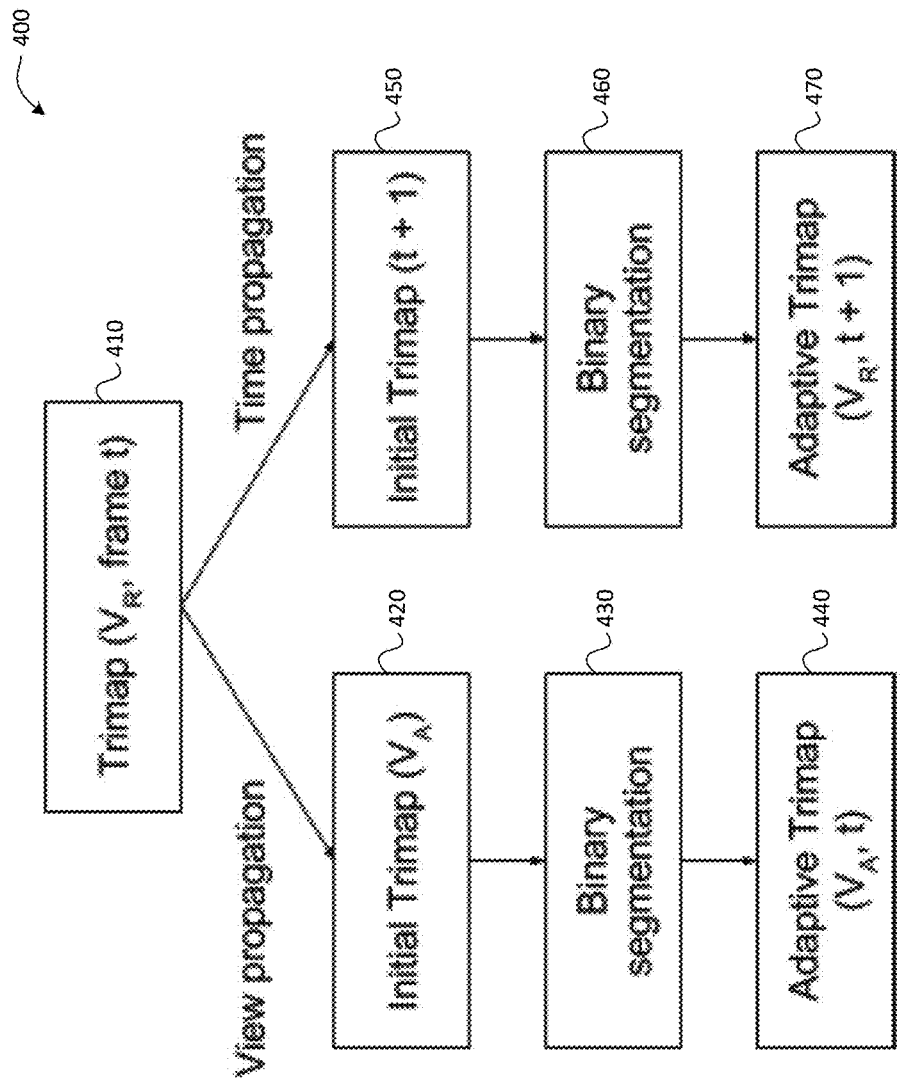
FIG. 4 is a diagram further depicting propagation of segmentation to adjacent frames and/or views of the video stream, according to one embodiment.

FIG. 4 is a diagram 400 further depicting propagation of segmentation to adjacent frames and/or views of the video stream 100, according to one embodiment. View propagation and/or time propagation may be used in any order. As shown, from a trimap 410 for a reference image at a reference view $V_R$ at time t, view propagation may result in the generation of an initial trimap 420 for an alternative (i.e., non-reference) view $V_A$. Binary segmentation 430 may be performed to generate an adaptive trimap 440 for the view $V_A$, which may be used to generate the alpha matte 170 for the view $V_A$. Similarly, from the trimap 410, time propagation may result in the generation of an initial trimap 450 for the view $V_R$ at a subsequent frame (at time t+1). Binary segmentation 460 may be performed to generate an adaptive trimap 470 for the view $V_R$ at time t+1.

Referring again to FIG. 2 in conjunction with FIG. 1, once all views and/or frames have been processed, in a step 292, the alpha mattes 170 generated for each of the images in the step 270 may be back-projected to the light-field or other data linking the views of the video stream 100 together. Known view geometry may be used, in conjunction with the depth map, to project the unknown region and compute the back-projected alpha matte for all other views. This may facilitate proper application of the alpha mattes 170 to the video stream 100. In a step 294, the alpha mattes 170 and/or back-projected alpha mattes may be used to apply the effect to the video stream 100 to generate the modified video stream 180 of FIG. 1. If desired, a single-view alpha matte may be back-projected to a 4D light-field to enable a 4D compositing workflow in which captured and computer-generated light-fields are blended together to form a final image.

In a step 296, the modified video stream 180 may be displayed for the user. This may be done, for example, by displaying the modified video stream 180 on a display screen such as those disclosed in the patent applications incorporated by reference herein. If desired, the method may be part of a virtual reality or augmented reality experience. The method may then end.

The method of FIG. 2 is only one of many possible methods that may be used to apply effects to video streams such as multi-frame video streams. According to various alternatives, various steps of FIG. 2 may be carried out in a different order, omitted, and/or replaced by other steps. For example, other image processing steps may be incorporated into the method of FIG. 2, at any stage of the method, and may be carried out with respect to the image prior to, during, and/or after application of effects.

Each of the steps of the method of FIG. 2 may be performed in a variety of ways within the scope of the present disclosure. Exemplary ways in which some of the steps may be performed will be shown and described in greater detail below. The following are merely exemplary; the steps of FIG. 2 may be carried out in ways that differ significantly from the following.

Binary Segmentation

In order to initiate binary segmentation via user input, as in the step 230, the reference view may be displayed in a graphical user interface. An artist may then define a 3D bounding box around one or more portions of the image. For example, for background replacement, the artist may define 3D bounding boxes around one or more foreground objects to be segmented from the background. This may be done by specifying the minimum and maximum X, Y and Z values for two opposite corners of the box.

Figure 5:
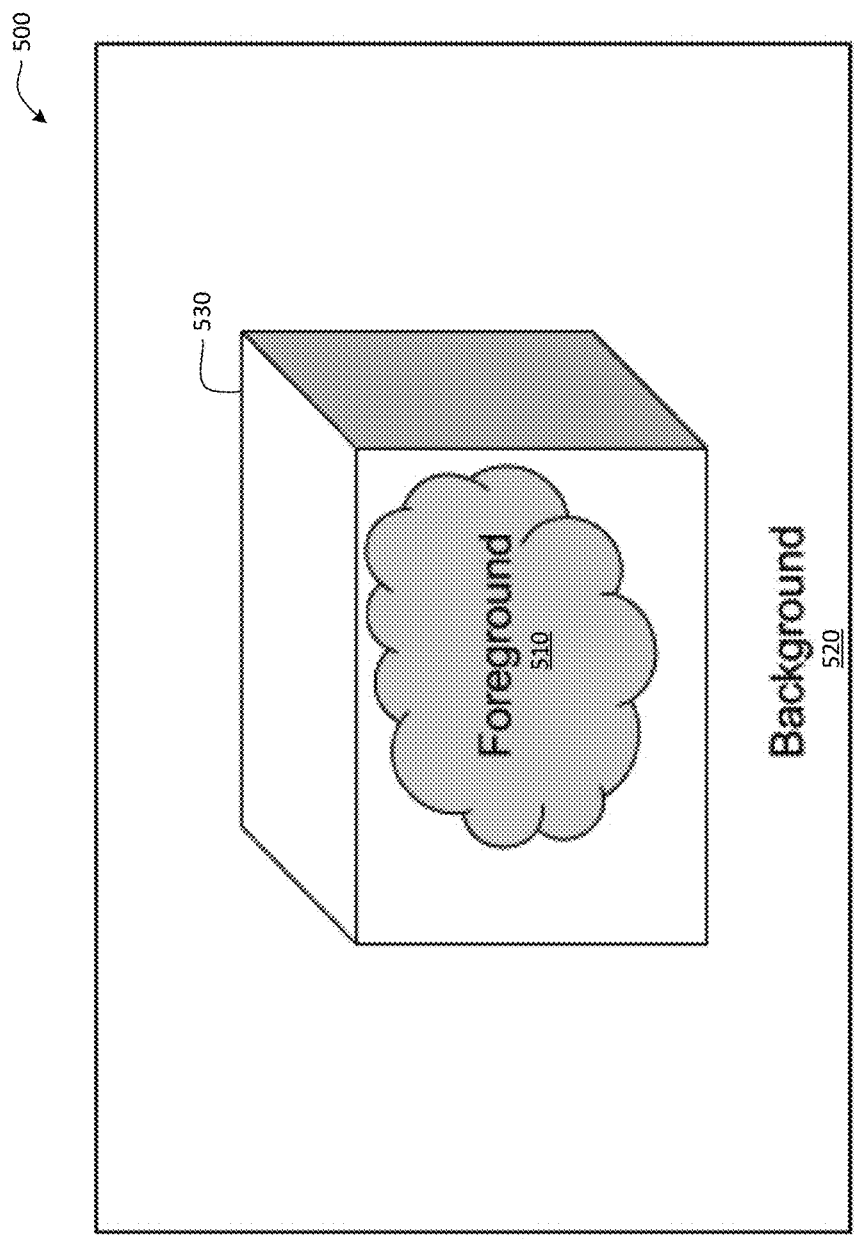
FIG. 5 is a screenshot diagram depicting one manner in which the user may designate foreground objects, according to one embodiment.

FIG. 5 is a screenshot diagram 500 depicting one manner in which the user may designate foreground objects, according to one embodiment. As shown, the image may contain a foreground 510 and a background 520. A 3D bounding box 530 may be placed as described above to circumscribe the foreground 510, thereby providing an initial boundary for an initial binary segmentation, which may be the boundary 132 of the initial binary segmentation 130 of FIG. 1.

This initial binary segmentation 130 may then be refined using iterative graph cuts. The first step may be to use the initial binary segmentation 130 to train four probability distributions from the initial binary segmentation 130, each represented as a Gaussian Mixture Model:

1. Foreground color probability $P_{FG,C}$;
2. Background color probability $P_{BG,C}$;
3. Foreground depth probability $P_{FG,D}$; and
4. Background depth probability $P_{BG,D}$.

The depth probability distributions (No.'s 3 and 4 above) may be introduced into the binary segmentation. The user may assign relative importance to depth or color information using a set of real-valued weights $W_C$ and $W_D$. The user may optionally alter these weights based on his or her level of confidence in the depth map and/or the color image.

With this definition, the probability that a given pixel p belongs to the foreground may be defined as:

$$P_F = P_{FG,C}{}^{w_C} \cdot P_{FG,D}{}^{w_D}$$

$W_C$ and $W_D$ may be set as follows:

$$0 < w_C < 1;\ 0 < w_D < 1;\ w_D + w_C = 1$$

The background probability may be defined in the same way.

Global minimization may then be performed to find the new label assignments (foreground or background) for each pixel based on the probability model above. A smoothness term may be used to encourage coherence in regions of similar color. In addition to existing approaches, the depth values of neighboring pixels may be included in this smoothness term, such that regions of similar depth will tend to have consistent labeling.

This final minimization may be done using a minimum cut algorithm that yields the final segmentation. This process (probability estimation and graph cut) may be repeated to obtain a new set of segmentation labels, typically until these segmentation labels converge. The result may be generation of the refined binary segmentation 140 of FIG. 1, as described in the step 250 of FIG. 2.

The user may have the option to correct this segmentation by drawing paint strokes over the areas that are known to belong to the foreground and/or background regions. Each pixel under the paint stroke may be labeled accordingly, in such a manner that user-defined labels are not altered by the optimization process, but are used to train the probability models.

Figure 6:
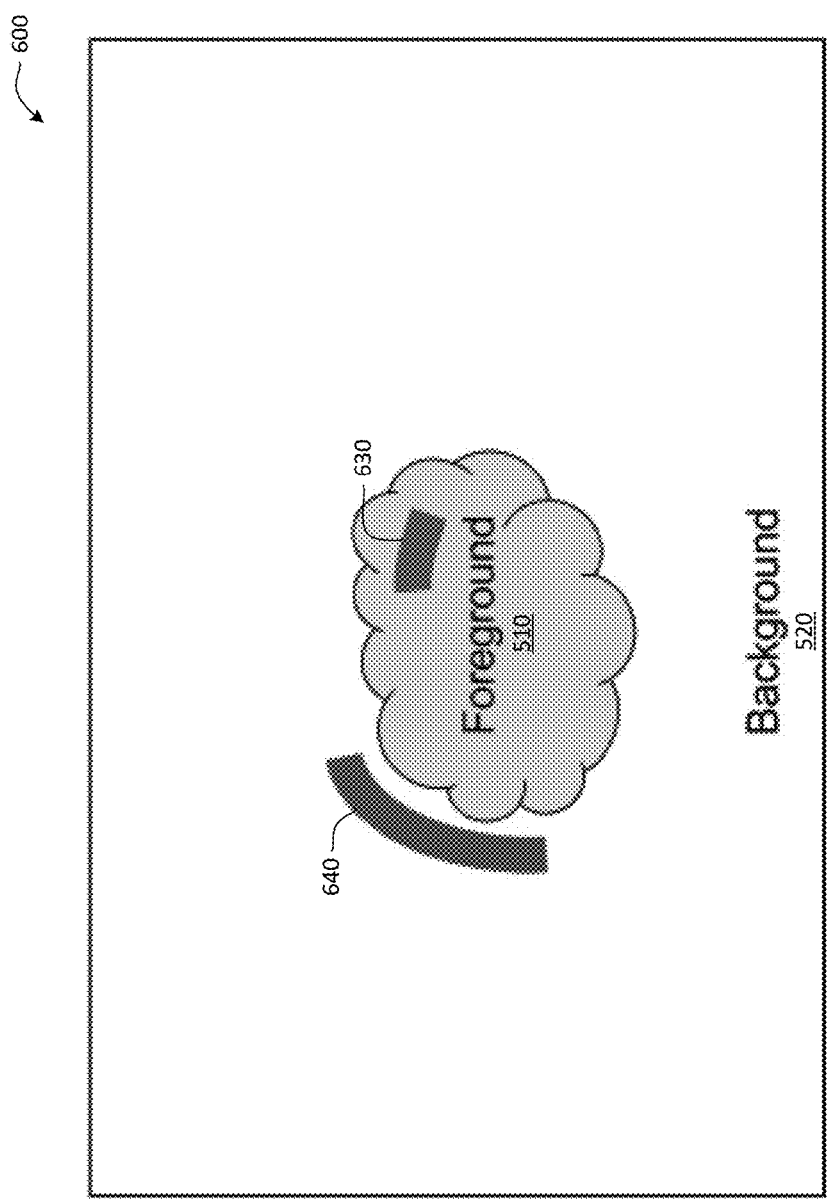
FIG. 6 is a screenshot diagram depicting the use of user-painted strokes to designate foreground and background material, according to one embodiment.

FIG. 6 is a screenshot diagram 600 depicting the use of user-painted strokes to designate foreground and background material, according to one embodiment. As shown, the user may use a red stroke 630 to designate portions of the image belonging to the foreground 510. Similarly, a blue stroke 640 may be used to designate portions of the image belonging to the background 520. As described above, these designations may not be modified during the iterative graph cuts.

Trimap Generation

The refined binary segmentation 140 may be used to compute the trimap 150, as in the step 260 of the method of FIG. 2. The trimap 150 may be a ternary image in which each pixel is labeled as belonging to one of three regions: foreground, background, and unknown. Errors may appear in the initial binary segmentation 130 and/or the refined binary segmentation 140, especially as the boundary 132 and/or the refined boundary 142 crosses low-contrast areas. The thickness of the trimap 150 may be dynamically selected based on an edge distance metric, such that the unknown region correctly contains the actual edge of the image.

Figure 7:
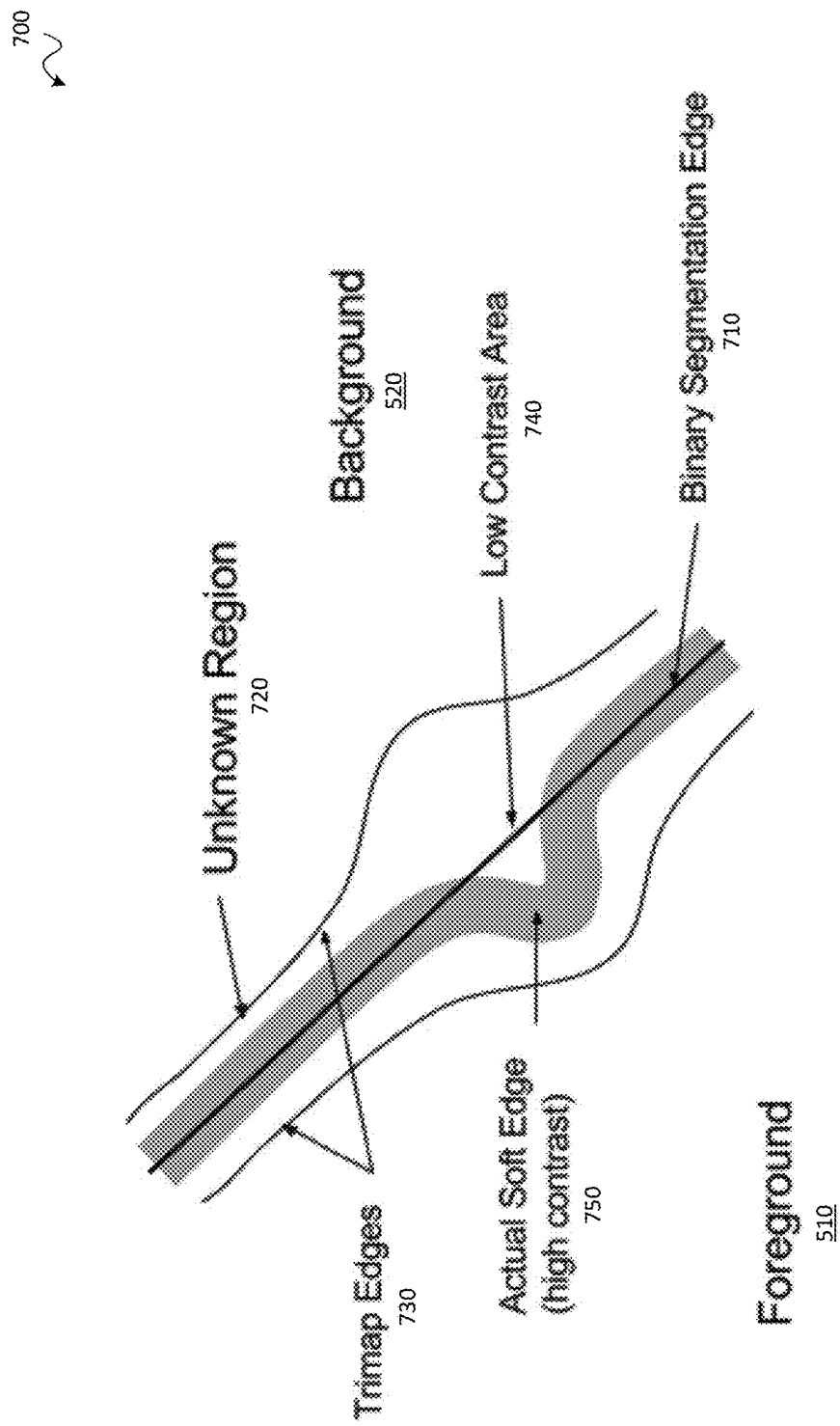
FIG. 7 is a portion of a trimap depicting the foreground, the background, and an unknown region (i.e., unknown segment), according to one embodiment.

FIG. 7 is a portion of a trimap 700 depicting the foreground 510, the background 520, and an unknown region 720 (i.e., unknown region), according to one embodiment. As shown, the unknown region 720 may separate the foreground 510 from the background 520. Computing the trimap 700 may include using a binary segmentation edge 710, which may be the refined boundary 142 from the refined binary segmentation 140, to position the unknown region 720.

The width of the unknown region 720 may be adaptive, in that it can change along the length of the unknown region 720. For example, the unknown region 720 may have trimap edges 730 that spread apart to accommodate features proximate the binary segmentation edge 710, such as an actual soft edge 750, which may be a high-contrast feature proximate a low contrast area 740.

In some embodiments, the following process may be used:
1. The user may set the minimum ($t_{min}$) and maximum ($t_{max}$) thicknesses for the unknown region 720, in pixels.
2. The high-contrast edges in the image may be detected. Formally, the contrast value at pixel I may be defined relative to neighborhood pixels j as:

$$C(i) = \sum_{j \neq i} \exp(-\beta_c \|\text{color}(i) - \text{color}(j)\|^2) - \beta_d \|\text{disparity}(i) - \text{disparity}(j)\|^2).$$

3. C may be thresholded to form a binary edge image C', such that C'(i) is equal to one on a high-contrast edge, and is otherwise equal to zero.
4. A distance map D may be computed from the binary image C'. For each pixel I, D(i) may contain the distance to the nearest high-contrast edge in C'. For speed considerations, E may be blurred with a triangle filter. This may create a ramp profile around each edge that indicates how far the current pixel is from that edge. Another more precise option is to compute the distance transform from C'.
5. The final trimap image T may then be computed as indicated in the exemplary pseudocode:

---
Initialize T = 'Foreground' or T = 'Background' according to the binary segmentation
For each pixel i on the binary segmentation edge:
    Set T(i) = 'Unknown'
    If D(i) is less than t max then:
        Set r = max(D(i), t min )
        For each pixel j in a disk of radius r around i:
            Set T(j) = 'Unknown'

---

The final trimap image may have an unknown region that correctly encompasses the nearest high-contrast edge(s), with a characteristic symmetric profile around the binary segmentation edge. Notably, the definition of the contrast image C(i) may ensure that depth edges are correctly captured, in addition to the color edges in the unknown region 720, while ensuring that the unknown region 720 is only as thick as needed. This may facilitate the matting to be carried out in the step 270 of FIG. 2.

The parameters $t_{min}$ and $t_{max}$ may control the final shape of the unknown region 720. They may be adjusted by the user to tighten or expand the unknown region 720 to achieve the desired result.

Time Propagation

As mentioned previously, the trimap 150 computed for the reference image may be propagated timewise to different frames of the video stream 100. This propagation may be continued until all frames of the video stream 100 have been segmented.

In some embodiments, the following process may be used:
1. The user may segment images from several frames from the video stream 100, as in the step 230, the step 240, the step 250, and the step 260. Each of these images may be referred to as a "reference image," and the corresponding frames of the video stream 100 may be referred to as "key frames."
2. The trimap 150 for each image in frames between the key frames may be interpolated as follows:
    a. The trimap may be propagated forward in time from each key frame, using optical flow.
    b. The trimap may be propagated backward in time.
    c. The forward and backward trimaps may be combined together.
3. The user may edit the segmentation by repeating user-aided segmentation for the intermediate frames, which may define a new key frame. The process may be repeated until the final segmentation is satisfactory for each image of each frame.

Figure 8:
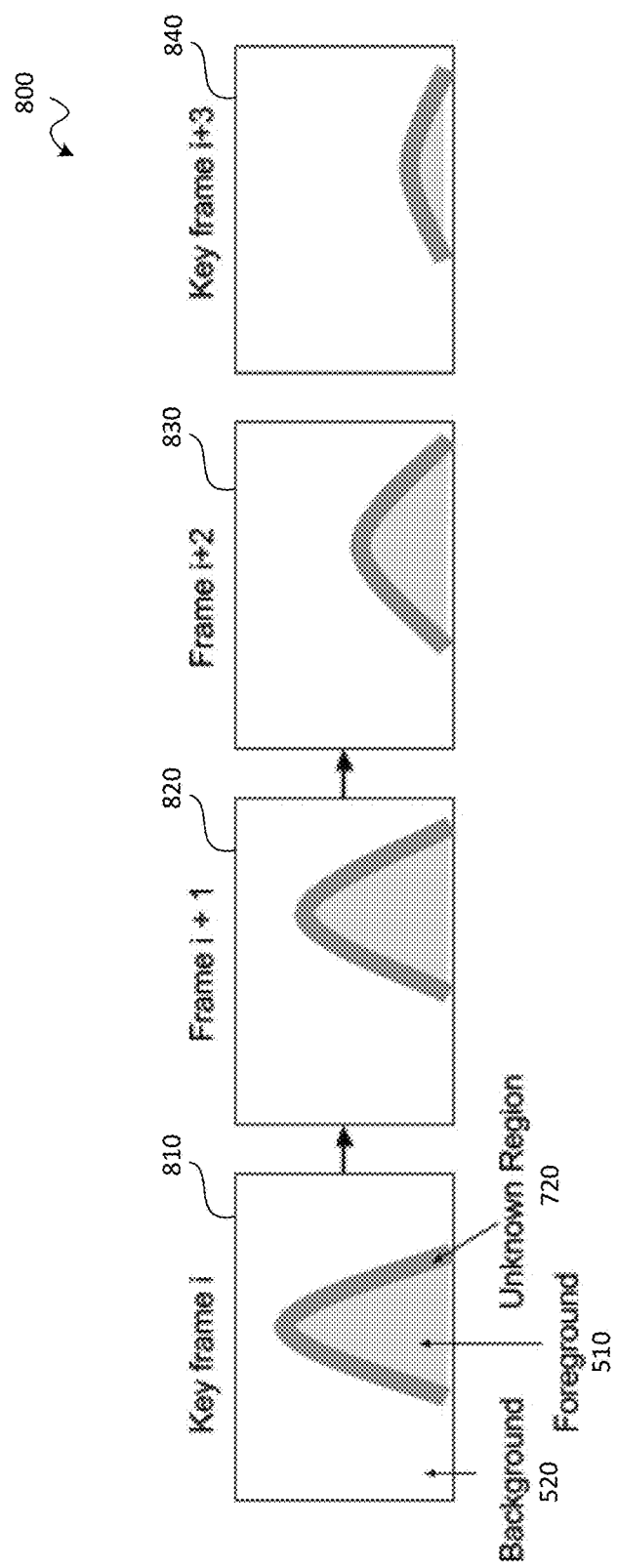
FIG. 8 is a set of images depicting forward trimap propagation using optical flow, according to one embodiment.
Figure 9:
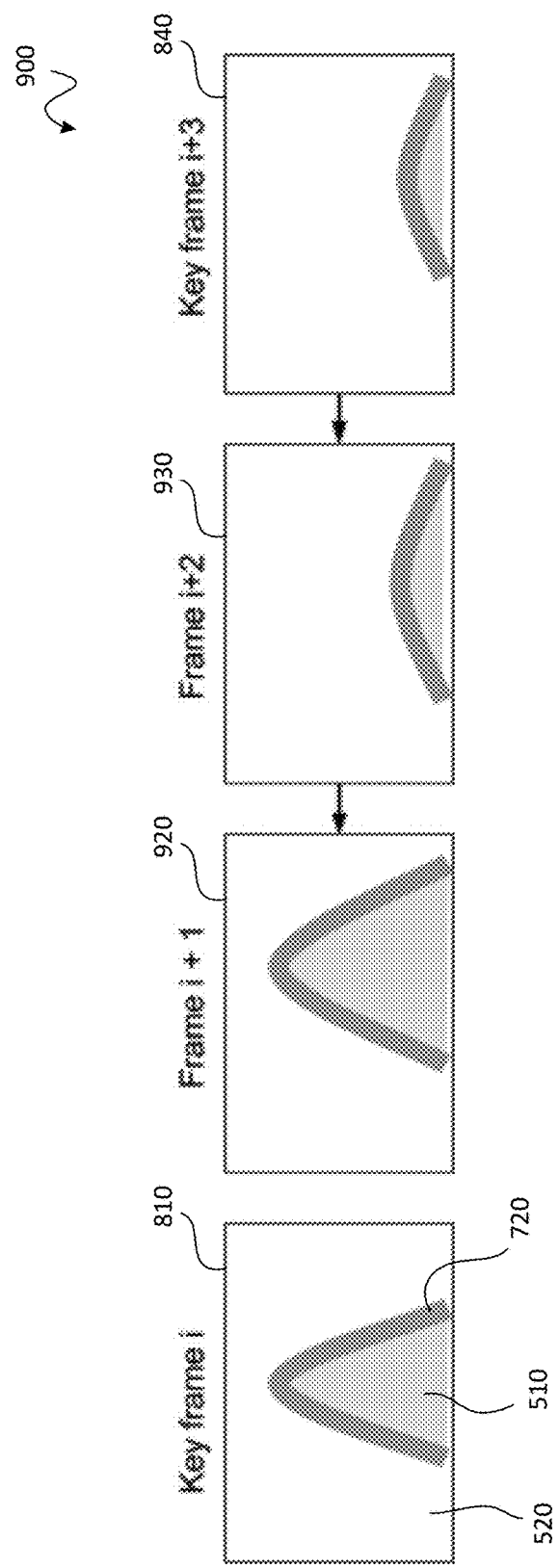
FIG. 9 is a set of images depicting backward trimap propagation using optical flow, according to another embodiment.

FIGS. 8 and 9 depict the propagation process. Specifically, FIG. 8 is a set 800 of images depicting forward trimap propagation using optical flow, according to one embodiment. Key frame i contains a reference image for which a trimap 810 has been computed, showing the foreground 510, the background 520, and the unknown region 720. Key frame i+3, three frames forward in time from key frame i, may have a corresponding trimap 840.

Optical flow may be applied to the trimap 810 to generate a trimap 820 for key frame i+1, one frame forward in time from key frame i. Similarly, optical flow may be applied to the trimap 820 to generate a trimap 830 for key frame i+2, two frames forward in time from key frame i. Thus, trimaps may be generated for frames i+1 and i+2, between key frames i and i+3, through propagation forward in time.

More precisely, forward propagation may be carried out in the following way:
1. Warp the trimap 810 from frame i to frame i+1 using optical flow. The resulting trimap 820 is imperfect; optical flow may be unable to account for occluded areas in frame i revealed in frame i+1.
2. Perform binary segmentation, as in the step, 230, the step 240, and/or the step 250, for only the unknown region 720. This may estimate the binary segmentation using the probability models computed from the foreground 510 and the background 520.
3. Compute the trimap, as in the step 260, for frame i+1.
4. Repeat steps one through three above starting from frame i+1, stopping if frame i+1 is a key frame.

FIG. 9 is a set 900 of images depicting backward trimap propagation using optical flow, according to another embodiment. Key frame i contains a reference image for which a trimap 810 has been computed, showing the foreground 510, the background 520, and the unknown region 720. Key frame i+3, three frames forward in time from key frame i, may have a corresponding trimap 840.

Backward propagation may be defined in the same way as forward propagation, using optical flow estimated in the reverse direction (from frame i to frame i−1). Optical flow may be applied to the trimap 840 to generate a trimap 930 for key frame i+2, one frame backward in time from key frame i+3. Similarly, optical flow may be applied to the trimap 930 to generate a trimap 920 for key frame i+1, two frames backward in time from key frame i+3. As with forward propagation, the resulting trimaps may be imperfect where occluded areas in frame i are revealed in frame i−1, and may be refined as needed to more accurately segment the unknown region 720. Thus, trimaps may be generated for frames i+1 and i+2, between key frames i and i+3, through propagation backward in time.

The forward and backward propagated trimaps 150 may disagree where optical flow inaccuracies are present. The goal of combining forward and backward trimaps 150 together, as in step 2(c) above, may be to reconcile the two propagated trimaps 150 to form the final segmentation. This will be further shown and described in connection with FIG. 10.

Figure 10:
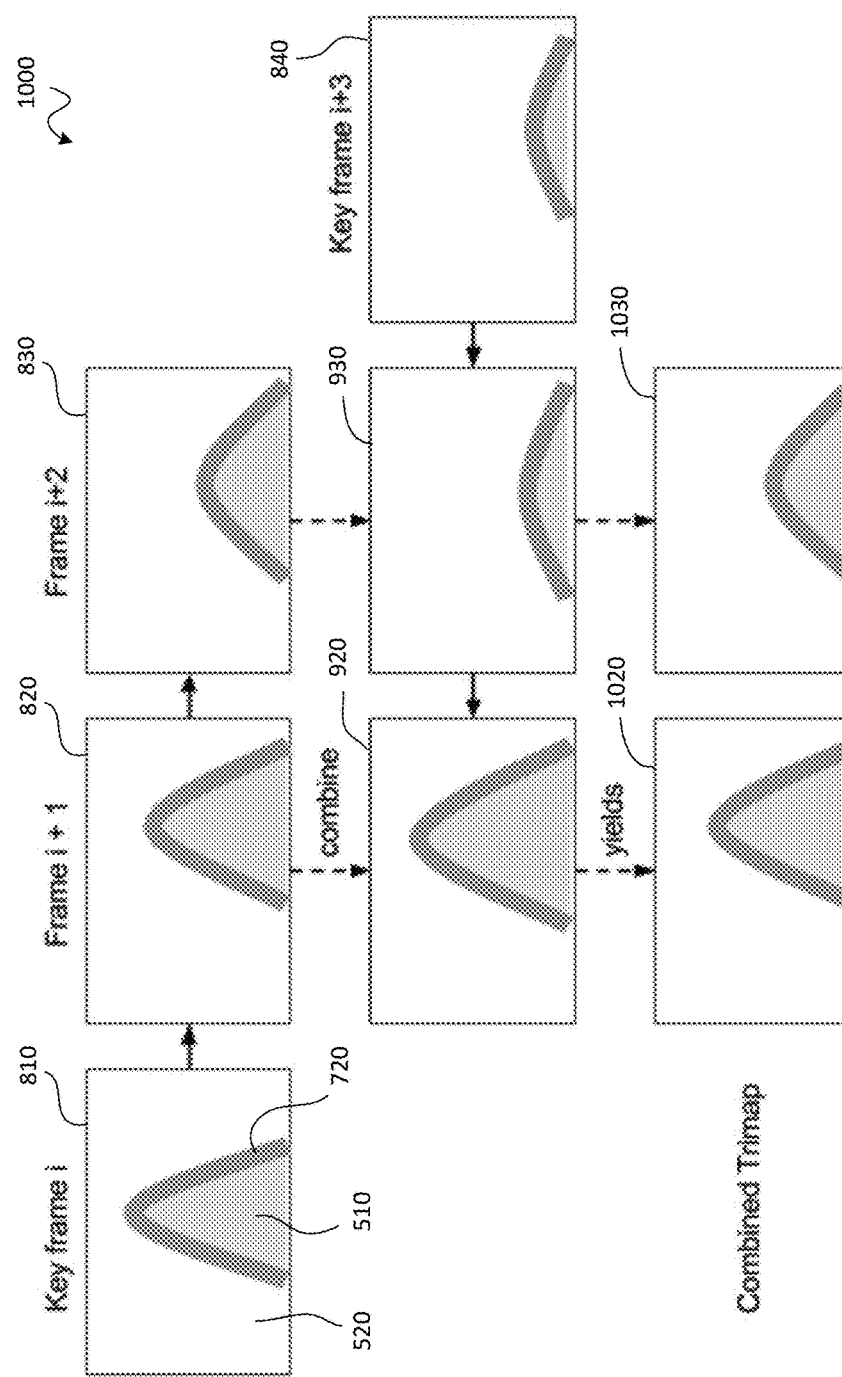
FIG. 10 is a set of images depicting combination of trimaps obtained via forward and backward propagation, according to one embodiment.

FIG. 10 is a set 1000 of images depicting combination of trimaps 150 obtained via forward and backward propagation, according to one embodiment. Specifically, the trimap 810 and the trimap 840 for the key frames, frame i and frame i+3, of FIGS. 8 and 9 are depicted. Further, the trimap 820 and the trimap 830 that were forward propagated in FIG. 8, and the trimap 920 and the trimap 930 that were backward propagated in FIG. 9, are also depicted. The trimap 820 and the trimap 920, both of which are for frame i+1, may be combined to compute a combined trimap 1020 for frame i+1. Similarly, the trimap 830 and the trimap 930, both of which are for frame i+2, may be combined to compute a combined trimap 1030 for frame i+2.

Figure 11:
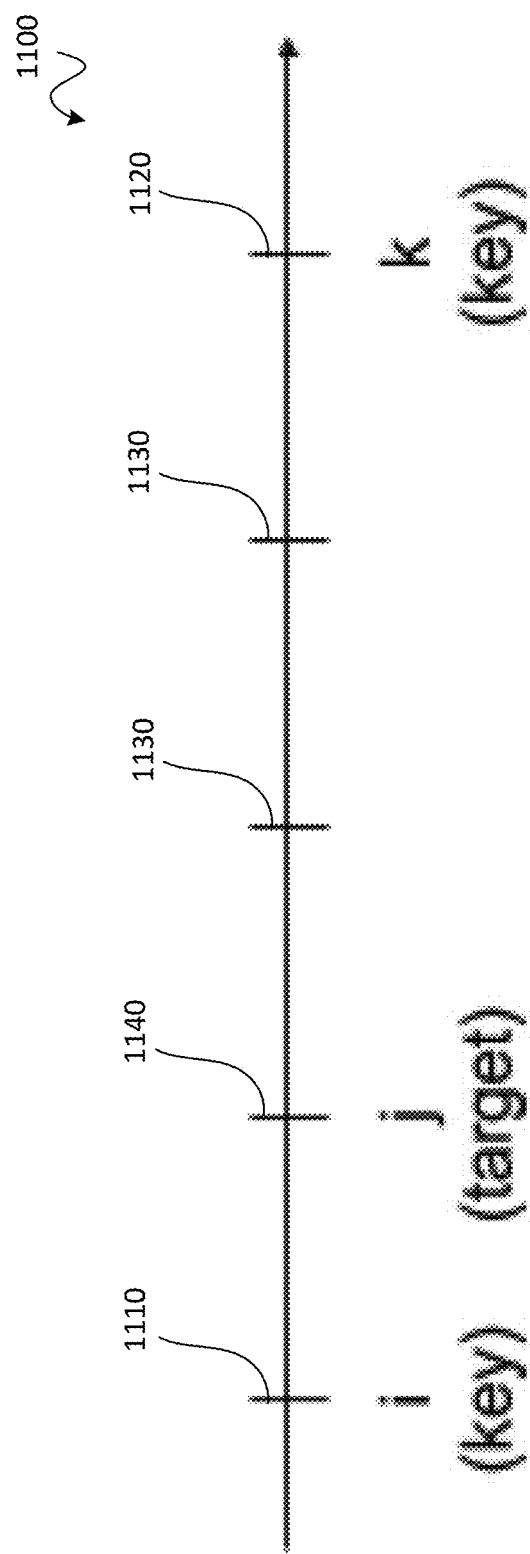
FIG. 11 is a graph depicting interpolation of a trimap for a frame j using a key frame at i and a key frame at k.

FIG. 11 is a graph 1100 depicting interpolation of a trimap for a frame j 1140 using a key frame at i 1110 and a key frame at k 1120. Additional frames 1130 may be between the key frame at k 1120 and the frame j 1140. For each pixel p at frame j, its combined trimap value $T_j(p)$ may be computed using (1) the forward-propagated trimap $TF_j$ from key frame i, and (2) the backward propagated trimap $TB_j$ from key frame k. This value may depend on whether frame j is closest to frame i or frame k. It may be computed according to the table 1200 of FIG. 12 if j is closest to frame i, and otherwise according to the table 1300 of FIG. 13.

FIG. 12 is a table 1200 depicting the combined trimap value if $|i-j| \leq |k-j|$, according to one embodiment. FIG. 13 is a table 1300 depicting the combined trimap value if $|i-j| > |k-j|$, according to one embodiment.

This mode of computing trimap values may have the following benefits:

Uncertainties around the image edge may be captured in the unknown region, in particular where forward and backward propagation disagree; and User input may be respected by prioritizing the closest key frame if only one of the propagated trimap pixels is known.

The combined trimap may be further refined by applying the step 230, the step 240, and/or the step 250, in unknown region 720 of the combined trimap (such as the trimap 1020 or the trimap 1030 of FIG. 10). The step 260 may be performed on the refined binary segmentation 140 to compute the final trimap 150.

View Propagation

Thus far, segmentation has been computed only for the reference view. Using a depth map computed at the reference view and the relative position of another view, it is possible to propagate the segmentation to that view. The following exemplary method assumes that the foreground object to segment is entirely visible from the reference view.

FIGS. 14A through 14D are a top view, preliminary trimap, binary segmentation, and final trimap for an adjacent (non-reference) view $V_A$ 1450, according to one embodiment. As shown in FIG. 14A, the point $X_A$ 1410 may be blocked in the reference view $V_R$ 1460 due to depth discontinuities at the boundary between the background 1420 and the foreground 1430. However, in the adjacent view $V_A$ 1450 for which a new trimap 150 is to be generated, the point $X_A$ 1410 may be visible. As shown, the background 1420 and the foreground 1430 may both be behind the image plane 1440.

Although, in the adjacent view $V_A$ 1450, the projection $p_A$ 1470 is set to Unknown in the preliminary trimap $T_A$ 1480, as shown in FIG. 14B, the correct value may be detected during binary segmentation 1482, as shown in FIG. 14C. The boundary may be eliminated in the final trimap $T_A'$ 1484, as shown in FIG. 14D.

More specifically, given the reference view $V_R$ 1460 and the adjacent view $V_A$ 1450, the final trimap $T_A'$ 1484 may be computed through use of the trimap at the reference view $T_R$ and the depth map $D_R$ (not shown). The following process may be used:

1. Initialize the preliminary trimap $T_A$ 1480 to "Unknown."
2. For each pixel $p_R$ in the reference view $V_R$ 1460:
   a. Compute its 3D view-space position $X_R$ using the depth map $D_R$ sampled at $p_R$.
   b. Transform $X_R$ into the space of the adjacent view $V_A$. This may provide a 3D position $X_A$.
   c. Project $X_A$ to a pixel $p_A$ of the adjacent view.
   d. Set $T_A(p_A)$ to the value of $T_R(p_R)$.
3. Apply the step 230, the step 240, and/or the step 250 only in the unknown region 720 of $T_A$ to estimate the binary segmentation 1482. A depth map $D_A$ is not assumed to be available for $V_A$. If it is not available, the binary segmentation 1482 in Step 3 may be done using the color image for $V_A$ only.
4. Apply the step 260 on the binary segmentation 1482 to estimate the final trimap $T_A'$ 1484.

Some pixels of $V_A$ may not be visible in $V_R$ due to occlusion at depth discontinuities. These pixels may be assigned an "Unknown" value by default in preliminary trimap $T_A$ 1480 in Step 1 above. This may be the correct value if the depth continuity straddles the true foreground/background boundary, but may be incorrect if the unknown region 720 is entirely inside the foreground 510 or background 520 of the image. This is the situation depicted in FIG. 10.

The correct value may be assigned by Steps 3 and 4 above. The binary segmentation 1482 generated in Step 3 above may be done so as to ensure consistency in neighboring regions. As the nearest neighbors of $p_A$ are all classified as "Background," this will "close" the boundary and set the correct value in the final trimap $T_A'$ 1484. The same solution may apply if the depth discontinuity is only in the foreground 510.

Multi-View Matting

Pursuant to the step 270 of the method of FIG. 2, the alpha matte 170 as well as the foreground pixel values may be estimated in the unknown region 720. Several algorithms exist to do so on single views, such as the matting Laplacian. Using information from adjacent views may allow the estimation of precise alpha values for the alpha matte 170. The problem of image matting may be to find the real-valued alpha (α) and color values F (foreground) and B (background) for a given pixel color I that satisfies the following compositing equation:

$$I=\alpha \cdot F+(1-\alpha)\cdot B$$

F, B, and α may usually be estimated together, which may entail the estimation of seven unknown parameters. In the alternative, B may be recovered from multiple views, which may eliminate three unknowns (one for each color channel) in the equation.

For example, an adjacent view $V_A$ may see behind part of the boundary of the unknown region 720. This situation can be detected by comparing the relative poses of $V_A$ and $V_R$ with the orientation of the boundary of the unknown region 720. FIG. 11 depicts the case where $V_A$ views the boundary from the left side.

Figure 15:
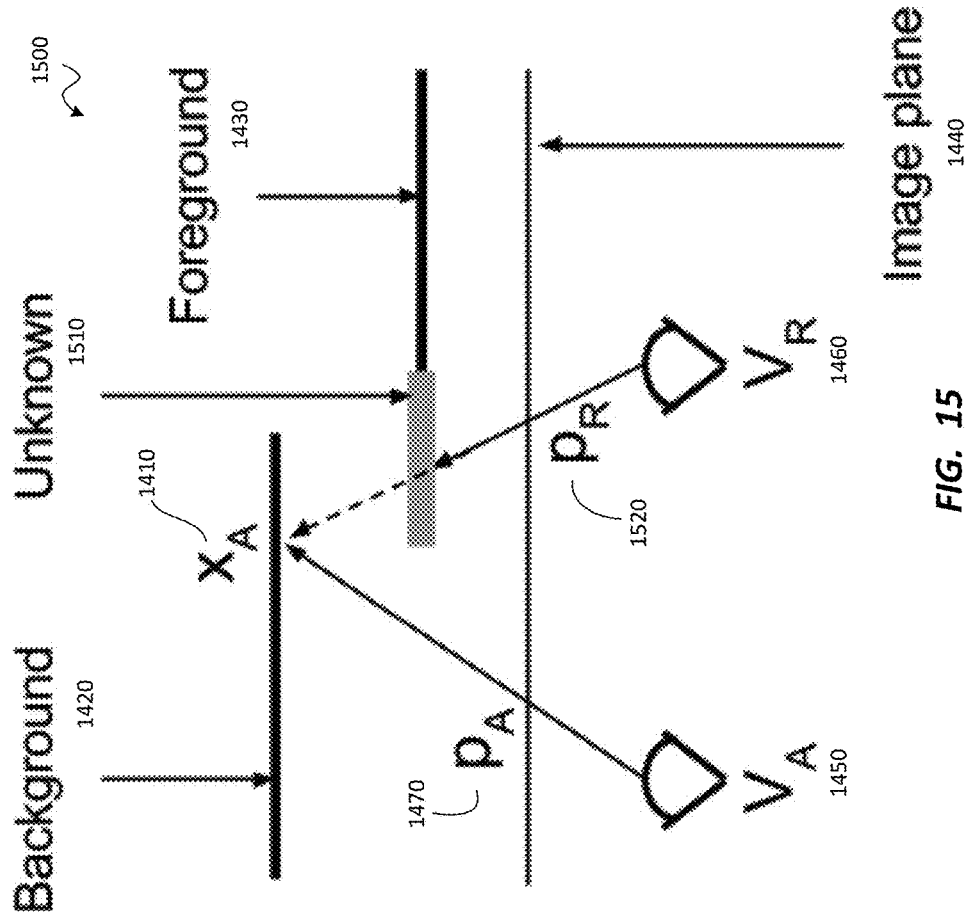
FIG. 15 is a top view for an adjacent (non-reference view) VA, according to one embodiment.

FIG. 15 is a top view 1500 for an adjacent (non-reference view) $V_A$ 1450, according to one embodiment. FIG. 15 depicts the same elements as FIG. 14A, with the addition of the unknown region 1510, and a projection $p_R$ 1520 from the reference view $V_R$ 1460.

The background samples may be recovered by projecting all of the color samples occluded by the foreground 510 from the reference view $V_R$ 1460 to the image plane 1440. This may be considered as a two-step process:

1. Depth Propagation. The depth map may be reprojected from $V_R$ to $V_A$, based on the known relative position of the two views. There may be "holes" in the depth map—the regions which are occluded in $V_R$ but are visible in $V_A$. The depth values may be filled in for these holes from highly-correlated neighboring pixels in both spatial and feature domains.
2. Reprojection. The 3D points of $V_A$ may be re-projected to the image pane of $V_R$. The objects occluded can now be "seen" from $V_R$.

The depth values may be filled into the holes as described in Step 1 above. The hole regions may be the occluded regions in $V_R$; thus, the depth values here may be closer to the nearby background pixels. An iterative propagation process may be used, as follows:

A. For a pixel p in the hole region, the depth value $z_p$ may be estimated by:

$$z_p=z_q, \text{ if } D(p,q)<\epsilon_s \& (\|I_p-I_q\|<\epsilon_c) \& q\in B$$

B. Pixel p may be labeled to "Filled." If $\epsilon_s$ and $\epsilon_c$ is not small enough, $\epsilon_s$ and $\epsilon_c$ may be updated, and the iterative propagation process may be re-started with the updated $\epsilon_s$ and $\epsilon_c$. Otherwise, the iterative propagation process may be stopped.

The recovered background samples may then be leveraged in the matting routine of the step 270. The expression $(x,y,z_B,I_B)$ may be used to denote a reprojection color sample in the image plane of VR, $(x,y,z_F,I_F)$ as an original color sample. Then, the reprojection samples may be compared with the original samples. There may be three cases:

Case 1: $\alpha(x_i,y_i)>0$, if $\|z_B(x_i,y_i)-z_F(x_i,y_i)\|>=\epsilon_z$.

Case 2: $\alpha(x_i,y_i)=0$ or $\alpha(x_i,y_i)=1$,
if $\|z_B(x_i,y_i)-z_F(x_i,y_i)\|<\epsilon_z$ and $\|I_B(x_i,y_i)-I_F(x_i,y_i)\|<\epsilon_c$.

Case 3: The pixel $x_i,y_i$ is an $\|z_B(x_i,y_i)-z_F(x_i,y_i)\|<\epsilon_z$ and $\|I_B(x_i,y_i)-I_F(x_i,y_i)\|>=\epsilon_c$, outlier, In Case 1, the number of unknowns for a pixel may be reduced from seven to four. For Case 2, it may reduce the area of the unknown region 720 and therefore the number of pixels to estimate. This may yield a more precise estimation of the foreground and alpha values.

In some embodiments, the final alpha value may be estimated in a two-step process. An initial estimate may be computed by finding the "best match" of foreground F and background B color samples for the image pixel I. "Best match" may be defined in the sense of minimizing the following cost function, for each prospective sample F and B:

$$C(\alpha)=\beta_{color}\|I-\alpha F-(1-\alpha)B\|+\beta_{distance}(\text{dist}(I,F)+\text{dist}(I,B))$$

Where $$\alpha = \frac{\sum_{c=r,g,b}(I_c-B_c)(F_c-B_c)}{\sum_{c=r,g,b}(F_c-B_c)^2},$$

dist(X, Y) is the Euclidean distance between two image samples, and $\beta_{color}$ and $\beta_{distance}$ are constants that apply relative penalties between color and distance mismatch, respectively.

If the background sample B is successfully recovered, it may be used to significantly narrow the search space. Specifically, only the best foreground sample F, according to the cost function C, may be needed. The search may be conducted either globally (for the best match over the entire foreground region) or locally (along the foreground/unknown region boundary). Then, it may be advantageous to add a post-processing step which smoothes the alpha values according to local color affinities. The "guided filter" algorithm or the "matting laplacian" algorithm may be used, depending on the quality level required by the user.

Foreground Color Estimation

After the final alpha matte is estimated, the foreground color F can be easily calculated when the background color B is known, according to the matting equation referenced above.

When the $I=\alpha\cdot F+(1-\alpha)\cdot B$ background color cannot be recovered from the multi-view prior, the most "probable" foreground and background color pair that minimizes the cost function C as explained above may be ascertained, except that alpha may be fixed in this case. This may yield the final foreground color estimated for the entire unknown region.

A final foreground image may be formed, for example, by:
  Setting pixels to black inside the known background region;
  In the unknown region, using the foreground color estimated above;
  In the known foreground region, using the pixels from the source image directly.

4D Compositing

The alpha matte 170 and foreground image generated as described above may be 2D, and therefore can only be used to composite other 2D images. Multi-view camera configurations such as light-field cameras may generate multiple views of the same scene. Once the alpha matte 170 and foreground image have been obtained for adjacent views, the alpha matte 170 and foreground image may be back-projected to a single RGBA light-field. This may allow usage of light-field techniques such as refocusing and projection for an arbitrary viewpoint.

Figure 16:
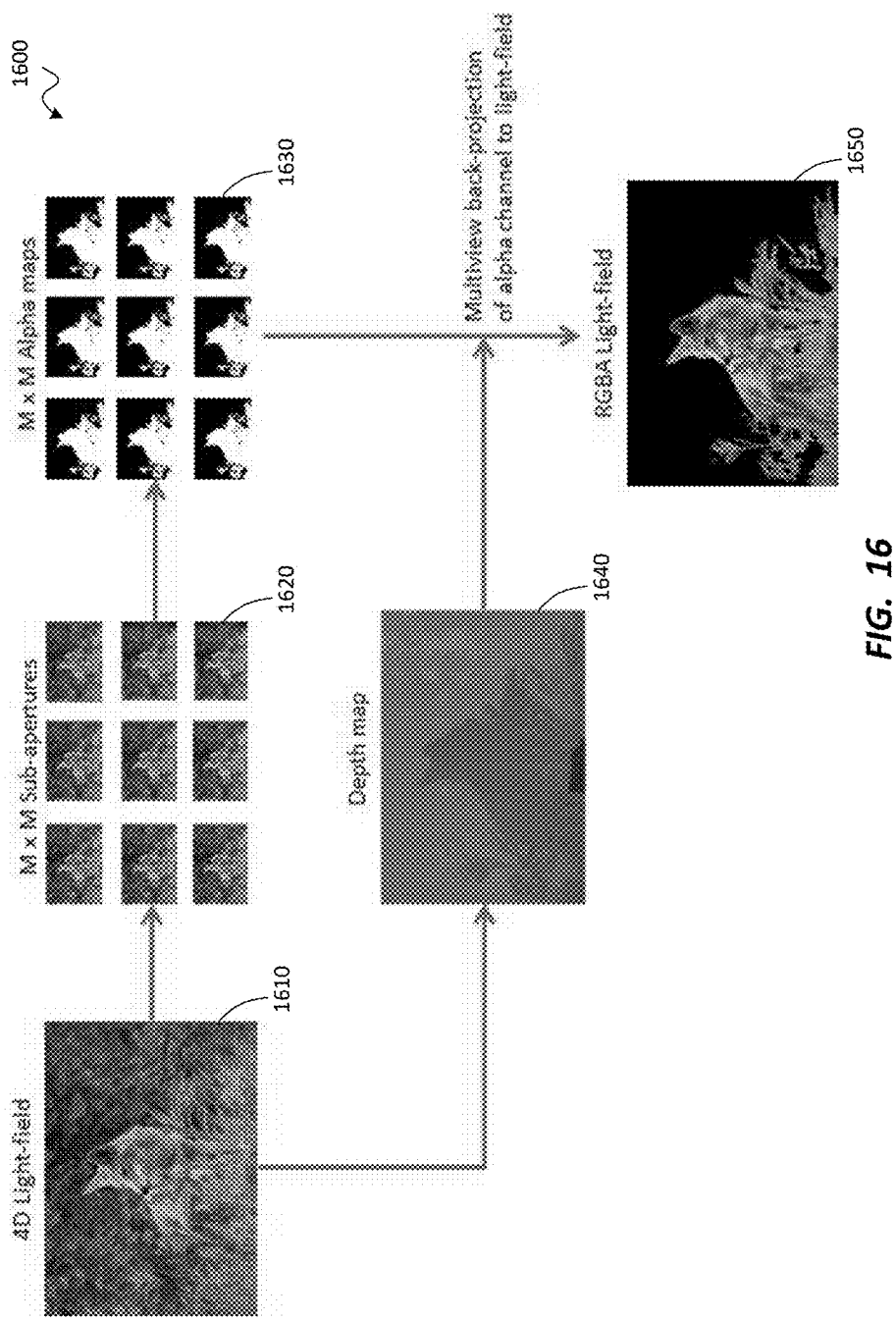
FIG. 16 is a set of screen shot images depicting steps in back-projection of alpha mattes from multiple views to a light-field, according to one embodiment.

FIG. 16 is a set 1600 of screen shot images depicting steps in back-projection of images from multiple views to a light-field, with multiple alpha maps, according to one embodiment. This describes a general workflow for back-projection, by which the foreground image as well as the alpha map may be backprojected to recreate a 4-component RGBA light-field. As shown, a 4D light-field 1610 may be captured, and may be used to compute a series of views, displayed as a series of M×M sub-aperture images 1620. A map (in this case an alpha map) may be generated for each of the sub-aperture images 1620, resulting in the generation of M×M alpha maps 1630. A similar process may be carried out to generate M×M foreground maps. A depth map 1640 may also be generated based on the 4D light-field 1610, and may be used in multi-view back-projection of alpha channels, or the alpha maps 1630, to the 4D light-field 1610. This may result in the generation of an RGBA light-field 1650 that includes an alpha channel that can now be projected into any sub-aperture images along with the color and/or depth data.

The above description and referenced drawings set forth particular details with respect to possible embodiments. Those of skill in the art will appreciate that the techniques described herein may be practiced in other embodiments. First, the particular naming of the components, capitalization of terms, the attributes, data structures, or any other programming or structural aspect is not mandatory or significant, and the mechanisms that implement the techniques described herein may have different names, formats, or protocols. Further, the system may be implemented via a combination of hardware and software, as described, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

Some embodiments may include a system or a method for performing the above-described techniques, either singly or in any combination. Other embodiments may include a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions of described herein can be embodied in software, firmware and/or hardware, and when embodied in software, can be downloaded to reside on and be operated from different platforms used by a variety of operating systems.

Some embodiments relate to an apparatus for performing the operations described herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, flash memory, solid state drives, magnetic or optical cards, application specific integrated circuits (ASICs), and/or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the techniques set forth herein are not described with reference to any particular programming language. It will be appreciated that a variety of programming languages may be used to implement the techniques described herein, and any references above to specific languages are provided for illustrative purposes only.

Accordingly, in various embodiments, the techniques described herein can be implemented as software, hardware, and/or other elements for controlling a computer system, computing device, or other electronic device, or any combination or plurality thereof. Such an electronic device can include, for example, a processor, an input device (such as a keyboard, mouse, touchpad, trackpad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or nonportable. Examples of electronic devices that may be used for implementing the techniques described herein include: a mobile phone, personal digital assistant, smartphone, kiosk, server computer, enterprise computing device, desktop computer, laptop computer, tablet computer, consumer electronic device, television, set-top box, or the like. An electronic device for implementing the techniques described herein may use any operating system such as, for example: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google, Inc. of Mountain View, Calif.; and/or any other operating system that is adapted for use on the device.

In various embodiments, the techniques described herein can be implemented in a distributed processing environment, networked computing environment, or web-based computing environment. Elements can be implemented on client computing devices, servers, routers, and/or other network or non-network components. In some embodiments, the techniques described herein are implemented using a client/server architecture, wherein some components are implemented on one or more client computing devices and other components are implemented on one or more servers. In one embodiment, in the course of implementing the techniques of the present disclosure, client(s) request content from server(s), and server(s) return content in response to the requests. A browser may be installed at the client computing device for enabling such requests and responses, and for providing a user interface by which the user can initiate and control such interactions and view the presented content.

Any or all of the network components for implementing the described technology may, in some embodiments, be communicatively coupled with one another using any suitable electronic network, whether wired or wireless or any combination thereof, and using any suitable protocols for enabling such communication. One example of such a network is the Internet, although the techniques described herein can be implemented using other networks as well.

While a limited number of embodiments has been described herein, those skilled in the art, having benefit of the above description, will appreciate that other embodiments may be devised which do not depart from the scope of the claims. In addition, it should be noted that the language used in the specification has been principally selected for readability and instructional purposes, and may not have been selected to delineate or circumscribe the inventive subject matter. Accordingly, the disclosure is intended to be illustrative, but not limiting.

What is claimed is:

1. A method for applying an effect to a multi-view video stream, the method comprising:
   in a data store, receiving the video stream;
   in an input device, receiving first user input designating a boundary between a foreground region and a background region, at a different depth from the foreground region, of a reference image of the video stream;
   in a processor, based on the first user input, generating a reference mask that indicates the foreground region and the background region;
   in the processor, using the reference mask to generate a first non-reference mask that indicates the foreground region and the background region for a first non-reference image, different from the reference image, of the video stream;
   in the processor, generating a modified video stream by using the reference mask to apply the effect to the reference image and using the first non-reference mask to apply the effect to the first non-reference image; and
   in a display device, displaying the modified video stream as a virtual reality or augmented reality experience.

2. The method of claim 1, further comprising, in a camera, capturing the video stream prior to receiving the video stream in the data store.

3. The method of claim 1, wherein:
   the reference image is from a reference frame of the video stream; and
   the first non-reference image is from a first frame, different from the reference frame, of the video stream.

4. The method of claim 3, further comprising, in the processor, using the first non-reference mask to generate a second non-reference mask that indicates the foreground region and the background region for a second non-reference image, from a second frame, different from the reference frame and the first frame, of the video stream;
   wherein generating the modified video stream further comprises using the second non-reference mask to apply the effect to the second non-reference image.

5. The method of claim 1, wherein:
   the reference image is from a reference view of a reference frame of the video stream; and
   the first non-reference image is from a first view, different from the reference view, of the reference frame of the video stream.

6. The method of claim 5, further comprising, in the processor, using the first non-reference mask to generate a second non-reference mask that indicates the foreground region and the background region for a second non-reference image, from a second view, different from the reference view and the first view, of the reference frame of the video stream;
   wherein generating the modified video stream further comprises using the second non-reference mask to apply the effect to the second non-reference image.

7. The method of claim 1, further comprising, in the input device, prior to receiving the first user input, receiving second user input designating the reference image from among a plurality of images of the video stream.

8. The method of claim 1, wherein generating the reference mask comprises:
   using the boundary to compute an initial binary segmentation designating the foreground region and the background region of the reference image;
   refining the boundary to delineate a refined boundary that more accurately designates the foreground region and the background region; and
   using the refined boundary to generate the reference mask.

9. The method of claim 8, wherein using the refined boundary to generate the reference mask comprises using the refined boundary to generate a trimap that further indicates an unknown region between the foreground region and the background region, the unknown region containing pixels that may belong to the foreground region or the background region.

10. The method of claim 9, further comprising, in the processor, applying a matting algorithm to the trimap to obtain an alpha matte comprising alpha values for the pixels in the foreground region, the background region, and the unknown region.

11. The method of claim 10, wherein the video stream comprises light-field video captured by one or more light-field cameras.

12. The method of claim 11, further comprising back-projecting the alpha matte and a foreground image of the foreground region to the light-field video.

13. The method of claim 9, wherein using the reference mask to generate the first non-reference mask comprises:
designating a first non-reference boundary between a first non-reference segment and a second non-reference segment of the first non-reference image;
using the first non-reference boundary to compute an initial non-reference binary segmentation designating the first non-reference segment and the second non-reference segment of the first non-reference image;
refining the first non-reference boundary to delineate a refined non-reference boundary that more accurately designates the first non-reference segment and the second non-reference segment; and
using the refined non-reference boundary to generate a non-reference trimap that further indicates an unknown non-reference segment between the first non-reference segment and the second non-reference segment, the unknown non-reference segment containing non-reference pixels that may belong to the first non-reference segment or the second non-reference segment.

14. The method of claim 13, further comprising, in the processor, applying a matting algorithm to the non-reference trimap to obtain a non-reference alpha matte comprising non-reference alpha values for the non-reference pixels in the unknown non-reference segment, to generate a non-reference foreground image of the foreground region.

15. A non-transitory computer-readable medium for applying an effect to a multi-view video stream, comprising instructions stored thereon, that when executed by a processor, perform the steps of:
causing a data store to receive the video stream;
causing an input device to receive first user input designating a boundary between a foreground region and a background region, at a different depth from the foreground region, of a reference image of the video stream;
based on the first user input, generating a reference mask that indicates the foreground region and the background region;
using the reference mask to generate a first non-reference mask that indicates the foreground region and the background region for a first non-reference image, different from the reference image, of the video stream;
generating a modified video stream by using the reference mask to apply the effect to the reference image and using the first non-reference mask to apply the effect to the first non-reference image; and
causing a display device to display the modified video stream as a virtual reality or augmented reality experience.

16. The non-transitory computer-readable medium of claim 15, further comprising instructions stored thereon, that when executed by a processor, cause a camera to capture the video stream prior to receiving the video stream in the data store.

17. The non-transitory computer-readable medium of claim 15, wherein:
the reference image is from a reference frame of the video stream;
the first non-reference image is from a first frame, different from the reference frame, of the video stream;
the non-transitory computer-readable medium further comprises instructions stored thereon, that when executed by a processor, uses the first non-reference mask to generate a second non-reference mask that indicates the foreground region and the background region for a second non-reference image, from a second frame, different from the reference frame and the first frame, of the video stream; and
generating the modified video stream further comprises using the second non-reference mask to apply the effect to the second non-reference image.

18. The non-transitory computer-readable medium of claim 15, wherein:
the video stream comprises a multi-view video stream;
the reference image is from a reference view of a reference frame of the video stream;
the first non-reference image is from a first view, different from the reference view, of the reference frame of the video stream;
the non-transitory computer-readable medium further comprises instructions stored thereon, that when executed by a processor, use the first non-reference mask to generate a second non-reference mask that indicates the foreground region and the background region for a second non-reference image, from a second view, different from the reference view and the first view, of the reference frame of the video stream; and
generating the modified video stream further comprises using the second non-reference mask to apply the effect to the second non-reference image.

19. The non-transitory computer-readable medium of claim 15, further comprising instructions stored thereon, that when executed by a processor, cause the input device, prior to receiving the first user input, to receive second user input designating the reference image from among a plurality of images of the video stream.

20. The non-transitory computer-readable medium of claim 15, wherein generating the reference mask comprises:
using the boundary to compute an initial binary segmentation designating the foreground region and the background region of the reference image;
refining the boundary to delineate a refined boundary that more accurately designates the foreground region and the background region; and
using the refined boundary to generate the reference mask;
wherein using the refined boundary to generate the reference mask comprises using the refined boundary to generate a trimap that further indicates an unknown region between the foreground region and the background region, the unknown region containing pixels that may belong to the foreground region or the background region.

21. The non-transitory computer-readable medium of claim 20, further comprising instructions stored thereon, that when executed by a processor, apply a matting algorithm to the trimap to obtain an alpha matte comprising alpha values for the pixels in the foreground region, the background region, and the unknown region.

22. The non-transitory computer-readable medium of claim 21, wherein:
the video stream comprises light-field video captured by one or more light-field cameras; and
the non-transitory computer-readable medium further comprises instructions stored thereon, that when executed by a processor, back-project the alpha matte and a foreground image of the foreground region to the light-field video.

23. The non-transitory computer-readable medium of claim 20, wherein using the reference mask to generate the first non-reference mask comprises:
   designating a first non-reference boundary between a first non-reference segment and a second non-reference segment of the first non-reference image;
   using the first non-reference boundary to compute an initial non-reference binary segmentation designating the first non-reference segment and the second non-reference segment of the first non-reference image;
   refining the first non-reference boundary to delineate a refined non-reference boundary that more accurately designates the first non-reference segment and the second non-reference segment; and
   using the refined non-reference boundary to generate a non-reference trimap that further indicates an unknown non-reference segment between the first non-reference segment and the second non-reference segment, the unknown non-reference segment containing non-reference pixels that may belong to the first non-reference segment or the second non-reference segment.

24. The non-transitory computer-readable medium of claim 23, further comprising instructions stored thereon, that when executed by a processor, apply a matting algorithm to the non-reference trimap to obtain a non-reference alpha matte comprising non-reference alpha values for the non-reference pixels in the unknown non-reference segment, to generate a non-reference foreground image of the foreground region.

25. A system for applying an effect to a multi-view video stream, the system comprising:
   a data store configured to receive the video stream;
   an input device configured to receive first user input designating a boundary between a foreground region and a background region, at a different depth from the foreground region, of a reference image of the video stream;
   a processor, communicatively coupled to the data store and the input device, configured to:
      based on the first user input, generate a reference mask that indicates the foreground region and the background region;
      use the reference mask to generate a first non-reference mask that indicates the foreground region and the background region for a first non-reference image, different from the reference image, of the video stream; and
      generate a modified video stream by using the reference mask to apply the effect to the reference image and using the first non-reference mask to apply the effect to the first non-reference image; and
   a display device configured to display the modified video stream as a virtual reality or augmented reality experience.

26. The system of claim 25, further comprising a camera configured to capture the video stream prior to receiving the video stream in the data store.

27. The system of claim 25, wherein:
   the reference image is from a reference frame of the video stream;
   the first non-reference image is from a first frame, different from the reference frame, of the video stream;
   the processor is further configured to use the first non-reference mask to generate a second non-reference mask that indicates the foreground region and the background region for a second non-reference image, from a second frame, different from the reference frame and the first frame, of the video stream; and
   the processor is further configured to generate the modified video stream by using the second non-reference mask to apply the effect to the second non-reference image.

28. The system of claim 25, wherein:
   the reference image is from a reference view of a reference frame of the video stream;
   the first non-reference image is from a first view, different from the reference view, of the reference frame of the video stream;
   the processor is further configured to use the first non-reference mask to generate a second non-reference mask that indicates the foreground region and the background region for a second non-reference image, from a second view, different from the reference view and the first view, of the reference frame of the video stream; and
   the processor is further configured to generate the modified video stream by using the second non-reference mask to apply the effect to the second non-reference image.

29. The system of claim 25, wherein the input device is further configured to, prior to receiving the first user input, receive second user input designating the reference image from among a plurality of images of the video stream.

30. The system of claim 25, wherein:
   the processor is further configured to generate the reference mask by:
      using the boundary to compute an initial binary segmentation designating the foreground region and the background region of the reference image;
      refining the boundary to delineate a refined boundary that more accurately designates the foreground region and the background region; and
      using the refined boundary to generate the reference mask; and
   the processor is further configured to use the refined boundary to generate the reference mask by using the refined boundary to generate a trimap that further indicates an unknown region between the foreground region and the background region, the unknown region containing pixels that may belong to the foreground region or the background region.

31. The system of claim 30, wherein the processor is further configured to apply a matting algorithm to the trimap to obtain an alpha matte comprising alpha values for the pixels in the foreground region, the background region, and the unknown region.

32. The system of claim 31, wherein:
   the video stream comprises light-field video captured by one or more light-field cameras; and
   the processor is further configured to back-project the alpha matte and a foreground image of the foreground region to the light-field video.

33. The system of claim 30, wherein the processor is further configured to use the reference mask to generate the first non-reference mask by:
   designating a first non-reference boundary between a first non-reference segment and a second non-reference segment of the first non-reference image;
   using the first non-reference boundary to compute an initial non-reference binary segmentation designating the first non-reference segment and the second non-reference segment of the first non-reference image;

refining the first non-reference boundary to delineate a refined non-reference boundary that more accurately designates the first non-reference segment and the second non-reference segment; and using the refined non-reference boundary to generate a non-reference trimap that further indicates an unknown non-reference segment between the first non-reference segment and the second non-reference segment, the unknown non-reference segment containing non-reference pixels that may belong to the first non-reference segment or the second non-reference segment.

34. The system of claim 33, wherein the processor is further configured to apply a matting algorithm to the non-reference trimap to obtain a non-reference alpha matte comprising non-reference alpha values for the non-reference pixels in the unknown non-reference segment to generate a non-reference foreground image of the foreground region.

\* \* \* \* \*